US011250836B2

(12) United States Patent
Sathsahayaraman et al.

(10) Patent No.: US 11,250,836 B2
(45) Date of Patent: Feb. 15, 2022

(54) TEXT-TO-SPEECH AUDIO SEGMENT RETRIEVAL

(71) Applicant: Microsoft Technology Licensing, LLC, Redmond, WA (US)

(72) Inventors: Muralidhar Sathsahayaraman, Bothell, WA (US); Saurabh Choudhury, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/915,613

(22) Filed: Jun. 29, 2020

(65) Prior Publication Data

US 2021/0343269 A1 Nov. 4, 2021

Related U.S. Application Data

(60) Provisional application No. 63/018,386, filed on Apr. 30, 2020.

(51) Int. Cl.
*G10L 13/047* (2013.01)
*H04L 29/08* (2006.01)
*H04L 12/58* (2006.01)

(52) U.S. Cl.
CPC .......... *G10L 13/047* (2013.01); *H04L 51/046* (2013.01); *H04L 51/18* (2013.01); *H04L 67/12* (2013.01)

(58) Field of Classification Search
None
See application file for complete search history.

(56) References Cited

U.S. PATENT DOCUMENTS

| 2003/0132953 | A1* | 7/2003 | Johnson | H04N 21/8126 715/716 |
| 2012/0245982 | A1* | 9/2012 | Daniel | G06F 16/438 705/14.4 |
| 2012/0290289 | A1 | 11/2012 | Manera et al. | |

(Continued)

OTHER PUBLICATIONS

"International Search Report and Written Opinion Issued in PCT Application No. PCT/US21/020974", dated Jun. 9, 2021, 11 Pages.

*Primary Examiner* — Chris Parry
*Assistant Examiner* — Chouat Abderrahmen
(74) *Attorney, Agent, or Firm* — Alleman Hall Creasman & Tuttle LLP

(57) ABSTRACT

A client computing system sends to a server system a presentation request for an audio presentation of electronic communications, and receives a manifest from the server system. The manifest indicates a plurality of segment-specific retrieval locations in which a different one of the plurality of segment-specific retrieval locations is indicated for each of a plurality of text-to-speech audio segments of the audio presentation. For each of the plurality of text-to-speech audio segments, the client computing system identifies a presentation order of the text-to-speech audio segment within the audio presentation; sends to the server system a segment request for the text-to-speech audio segment at the segment-specific retrieval location for that text-to-speech audio segment; receives from the server system the text-to-speech audio segment responsive to the segment request for that text-to-speech audio segment; and outputs the text-to-speech audio segment in the identified presentation order.

20 Claims, 14 Drawing Sheets

(56) References Cited

U.S. PATENT DOCUMENTS

| | | | |
|---|---|---|---|
| 2014/0379814 A1* | 12/2014 | Graff | H04M 1/7243 |
| | | | 709/206 |
| 2014/0379871 A1* | 12/2014 | Brandenburg | H04L 65/1069 |
| | | | 709/219 |
| 2015/0256277 A1* | 9/2015 | Johnson | H04L 67/26 |
| | | | 340/601 |
| 2017/0193983 A1* | 7/2017 | May | H04M 1/6066 |
| 2018/0191586 A1* | 7/2018 | Chen | H04L 67/10 |
| 2019/0075374 A1* | 3/2019 | Panchaksharaiah | |
| | | | H04N 21/432 |
| 2021/0142880 A1* | 5/2021 | Bangera | G16H 20/30 |

* cited by examiner

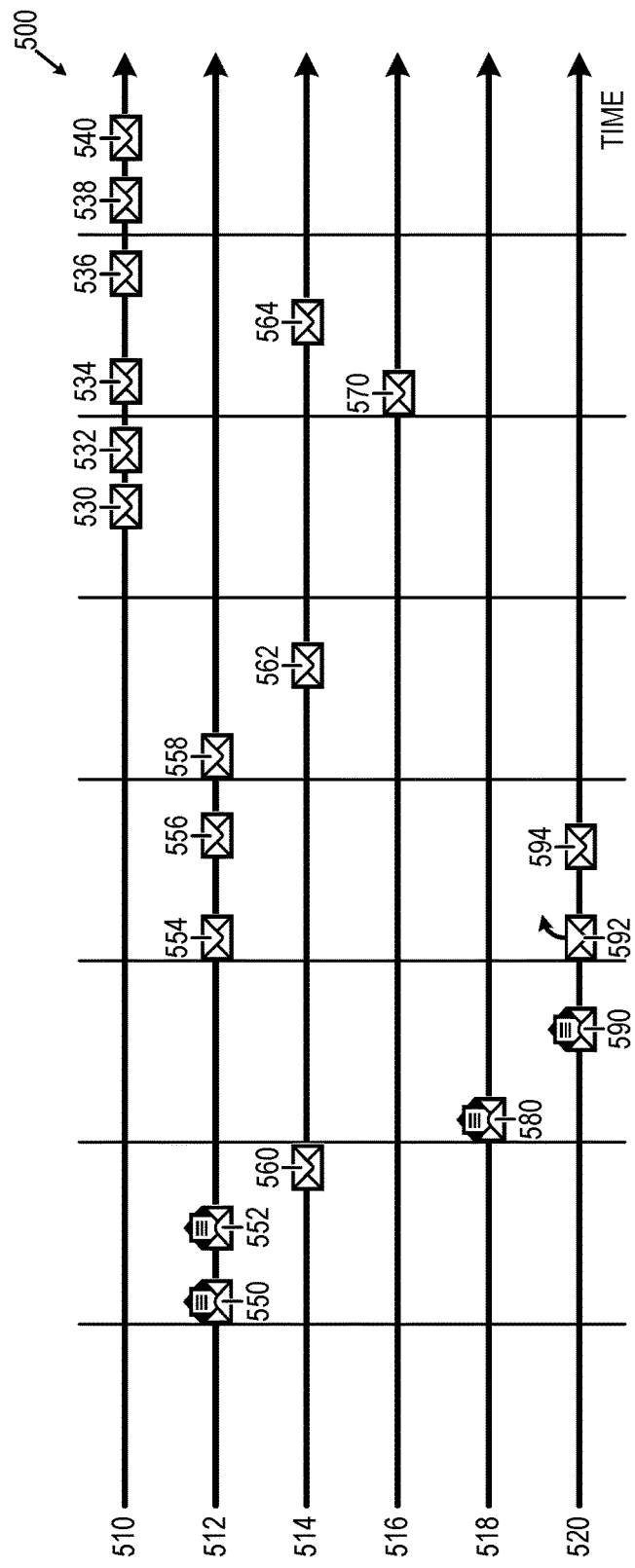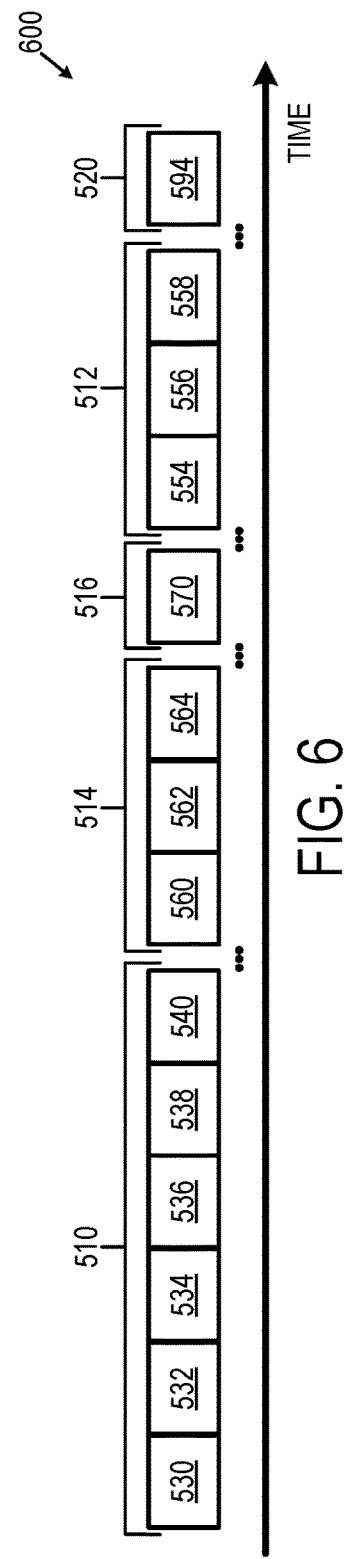
FIG. 5
FIG. 6

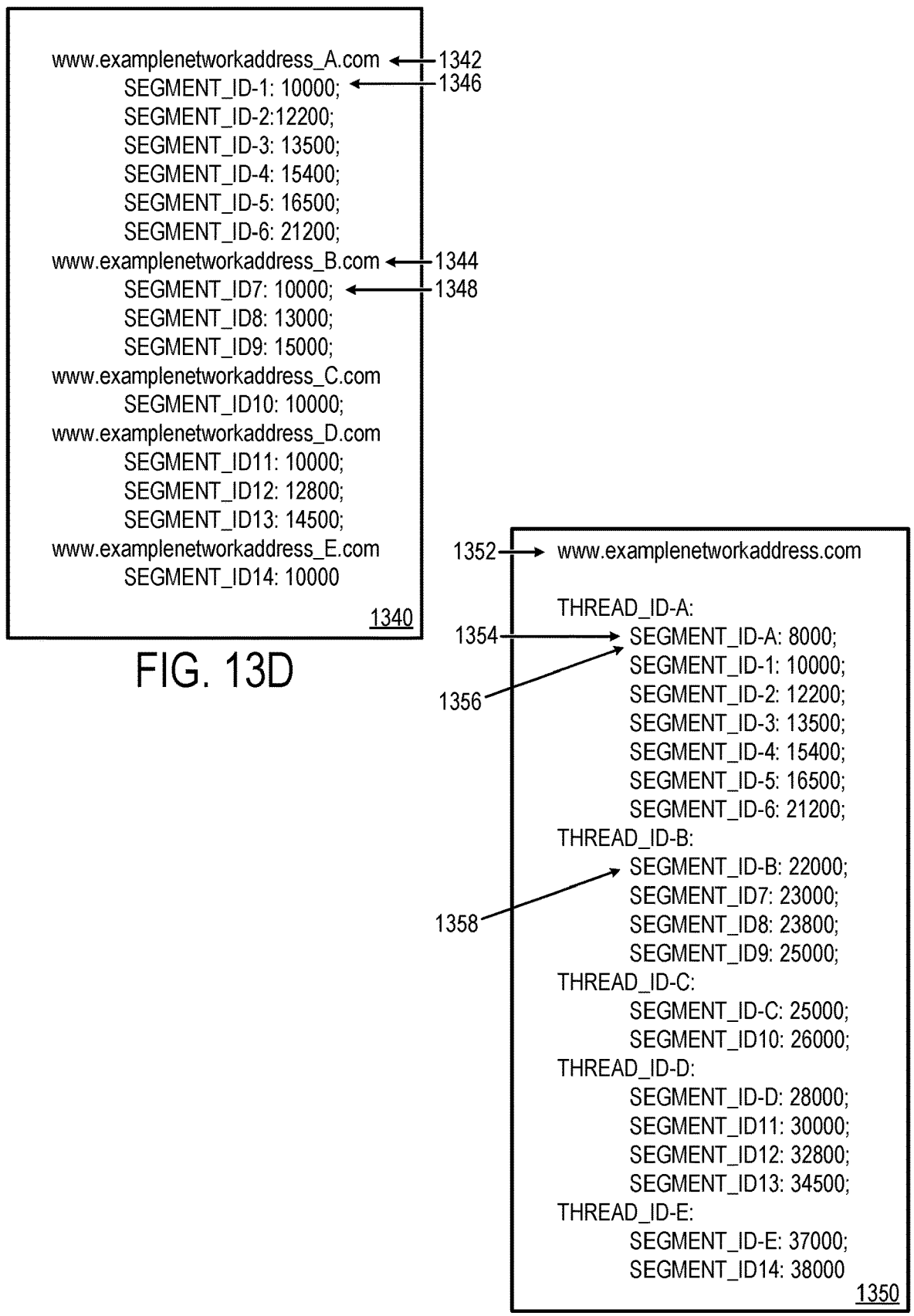

TEXT-TO-SPEECH AUDIO SEGMENT RETRIEVAL

CROSS REFERENCE TO RELATED APPLICATIONS

This application claims priority to U.S. Provisional Patent Application Ser. No. 63/018,386, filed Apr. 30, 2020, the entirety of which is hereby incorporated herein by reference for all purposes.

BACKGROUND

Communication networks support a broad array of electronic communications among users. Text-based electronic communications may take a variety of different forms, including email, text/SMS messages, real-time/instant messages, multimedia messages, social networking messages, messages within multi-player video games, etc. Users may read and type responses to these forms of electronic communications via a personal electronic device, such as a mobile device or desktop computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an example, a client computing system sends to a server system a presentation request for an audio presentation of electronic communications, and receives a manifest from the server system. The manifest indicates a plurality of segment-specific retrieval locations in which a different one of the plurality of segment-specific retrieval locations is indicated for each of a plurality of text-to-speech audio segments of the audio presentation. For each of the plurality of text-to-speech audio segments, the client computing system identifies a presentation order of the text-to-speech audio segment within the audio presentation; sends to the server system a segment request for the text-to-speech audio segment at the segment-specific retrieval location for that text-to-speech audio segment; receives from the server system the text-to-speech audio segment responsive to the segment request for that text-to-speech audio segment; and outputs the text-to-speech audio segment in the identified presentation order.

BRIEF DESCRIPTION OF THE DRAWINGS

FIG. 5 depicts an example timeline of electronic communications for a recipient.

FIG. 6 depicts an example timeline of a presentation order of the electronic communications of FIG. 5.

FIGS. 13A-13E depict examples of data that may be included in or otherwise indicated by the manifest of FIG. 12.

DETAILED DESCRIPTION

The use of text-based electronic communications such as email, text messaging, and instant messaging has grown to become a primary mode of communication in modern society. Mobile computing devices have enabled people to receive their electronic communications at virtually any time and location. As people go about their day, they may be frequently interrupted by the need or desire to review new electronic communications. Visual consumption of text and multimedia content through graphical user interfaces may distract people from simultaneously performing other tasks or may preclude people from performing tasks until after the electronic communications have been visually reviewed. For example, while operating a vehicle, it may be impossible or dangerous for a person to visually review new text-based communications.

According to an aspect of the present disclosure, an audio presentation of electronic communications may be provided at a client computing system by use of a manifest. In an example, a server system generates a manifest that indicates a plurality of segment-specific retrieval locations for each of a plurality of text-to-speech audio segments of the audio presentation. This manifest can be structured to provide the client computing system with control over the presentation order of electronic communications or can enable the server system to define the presentation order, depending on implementation. Audio segments can be streamed to the client computing system from the server system based on the manifest.

Furthermore, according to an aspect of the present disclosure, the use of graphical user interfaces to present text and multimedia content of electronic communications may be augmented or replaced by audible presentation of the electronic communications in a manner that provides users with context for the presentation experience and control over the audible presentation. Such an audible presentation may provide a user experience that is commensurate with or improved over the visual consumption of the electronic communications, while enabling users to simultaneously perform tasks that are difficult or impossible to perform while using solely a graphical user interface. In essence, the disclosed audible presentation can translate text-based communications into an experience similar to listening to a podcast.

Figure 1:
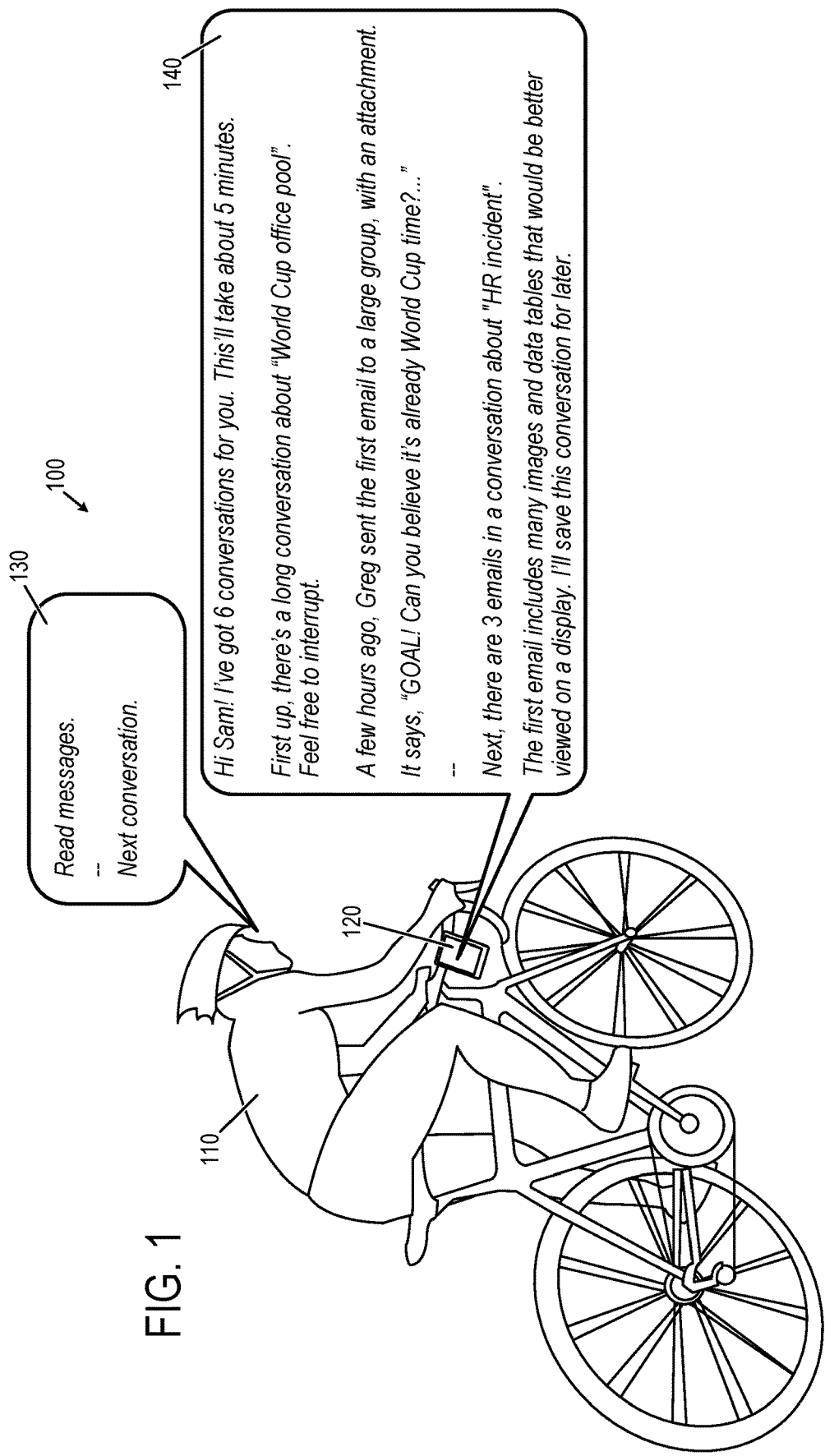
FIG. 1 depicts an example interaction between a user and a conversational computing interface device.

FIG. 1 depicts an example interaction 100 between a user 110 and a conversational computing interface device 120. Conversational computing interface device 120 may include a computing device or computing system that implements a conversational computing interface, a non-limiting example of which includes the personal assistant machine described in further detail herein. In this example, user 110 is commuting to work by bicycle while interacting with device 120 through user speech 130. Device 120 in this example takes the form of a mobile computing device. In response to spoken commands of user speech 130, device 120 may output audio information to user 110 as device speech 140. This is an example of a hands-free, display-free interaction that enables the user to engage in tasks, such as commuting to work by bicycle, while simultaneously processing electronic communications.

As shown in user speech 130, user 110 begins a dialog with device 120 by speaking the command "Read messages." In response to the spoken command of the user, in device speech 140, device 120 outputs audio information that includes: "Hi Sam! I've got 6 conversations for you. This'll take about 5 minutes." In this portion of device speech 140, device 120 outputs audio information in the form of natural language that greets user 110 by the user's name (i.e., "Sam"), identifies a quantity (i.e., "6") of conversation threads that contain unreviewed electronic communications for the user as a recipient of those communications, and identifies a duration of time (i.e., "about 5 minutes") for the user to review the conversation threads through audible output of the contents of the electronic communications. Thus, user 110 is informed by device 120 as to the anticipated duration of an audio presentation of the unreviewed electronic communications prior to progressing through the audio presentation, thereby enabling the user to make informed decisions as to whether particular electronic communications should be reviewed or skipped.

Continuing with the example dialog of FIG. 1, device 120 continues by outputting a summary of a first conversation thread to user 110, which identifies a quantity and/or duration of unreviewed electronic communications of the conversation thread (i.e., "long") and identifies a subject of the conversation thread (i.e., "World Cup office pool"). Thus, user 110 is informed as to the subject and estimated time for reviewing unreviewed electronic communications of the first conversation thread prior to progressing through an audio presentation of the first conversation thread. Additionally, device 120 indicates to user 110 that the user is "free to interrupt", which informs the user that spoken commands by the user may be used to advance or interrupt audio presentation of the first conversation thread.

Next, device 120 outputs a summary of a first electronic communication of the first conversation thread to user 110, which identifies a relative time (i.e., "a few hours ago") that the first electronic communication was received, identifies a sender of the first electronic communication (i.e., "Greg"), identifies a type of the first electronic communication (i.e., "email"), identifies a quantity of other recipients or the audience of the first electronic communication (i.e., "a large group"), identifies the presence of an attachment to the first electronic communication (i.e., "with an attachment"), and identifies at least a portion of text content of a message of the first electronic communication (e.g., "Goal! Can you believe it's already World Cup time? . . . ").

In this example, upon hearing a portion of the text content of the first electronic communication, in user speech 130 user 110 speaks the command "Next conversation." Responsive to this spoken command by user 110, device 120 advances the audio presentation of the unreviewed electronic communications to a second conversation thread, thereby skipping audio presentation of remaining unreviewed electronic communications of the first conversation thread. For example, device 120 responds to user 110 by outputting a summary of the second conversation thread, which identifies a quantity of unreviewed electronic communications of the second conversation thread (i.e., "3"), identifies a type of electronic communications of the second conversation thread (i.e., "email"), and identifies a subject of the second conversation thread (i.e., "HR incident").

Device 120 may progress through conversation threads in the manner described above until all the unreviewed electronic communications have been reviewed by user 110 or the user preemptively elects to stop the dialog. By device 120 summarizing conversation threads and their contents, user 110 is provided with sufficient information to make informed decisions regarding whether a particular conversation thread or electronic communication should be reviewed by the user in the current session. In an example in which user 110 does not advance or interrupt audio presentation of unreviewed electronic communications, the audio presentation by device 120 will conclude in approximately the duration of time (e.g., "5 minutes") identified by the device. However, by advancing the audio presentation, user 110 may review electronic communications within a shorter time period.

FIG. 1 further depicts an example in which device speech 140 provides a narrative that describes an aspect of the message content that would otherwise be difficult for user 110 to review by audio presentation of that message content. In this example, device speech 140 includes the narrative—"the first email includes many images and data tables that would be better viewed on a display" within the audio presentation that describes an aspect of the first electronic communication contained in the conversation about "HR incident". By providing user 110 with a summary of content of the electronic communication and/or a notice of content that may not be suitable for audio presentation without a graphical display, the user may make an informed decision as to whether the content of the electronic communication should be audibly reviewed by the user or instead omitted from the audio presentation and saved for a later time when the user has the ability to review the content via a graphical display device. Furthermore, the narrative describing an aspect of the content of an electronic communication may enable data such as visual content, weblinks, or foreign language content to be summarized or omitted from the audio presentation, thereby reducing an amount of time needed to audibly review the electronic communication.

Figure 2:
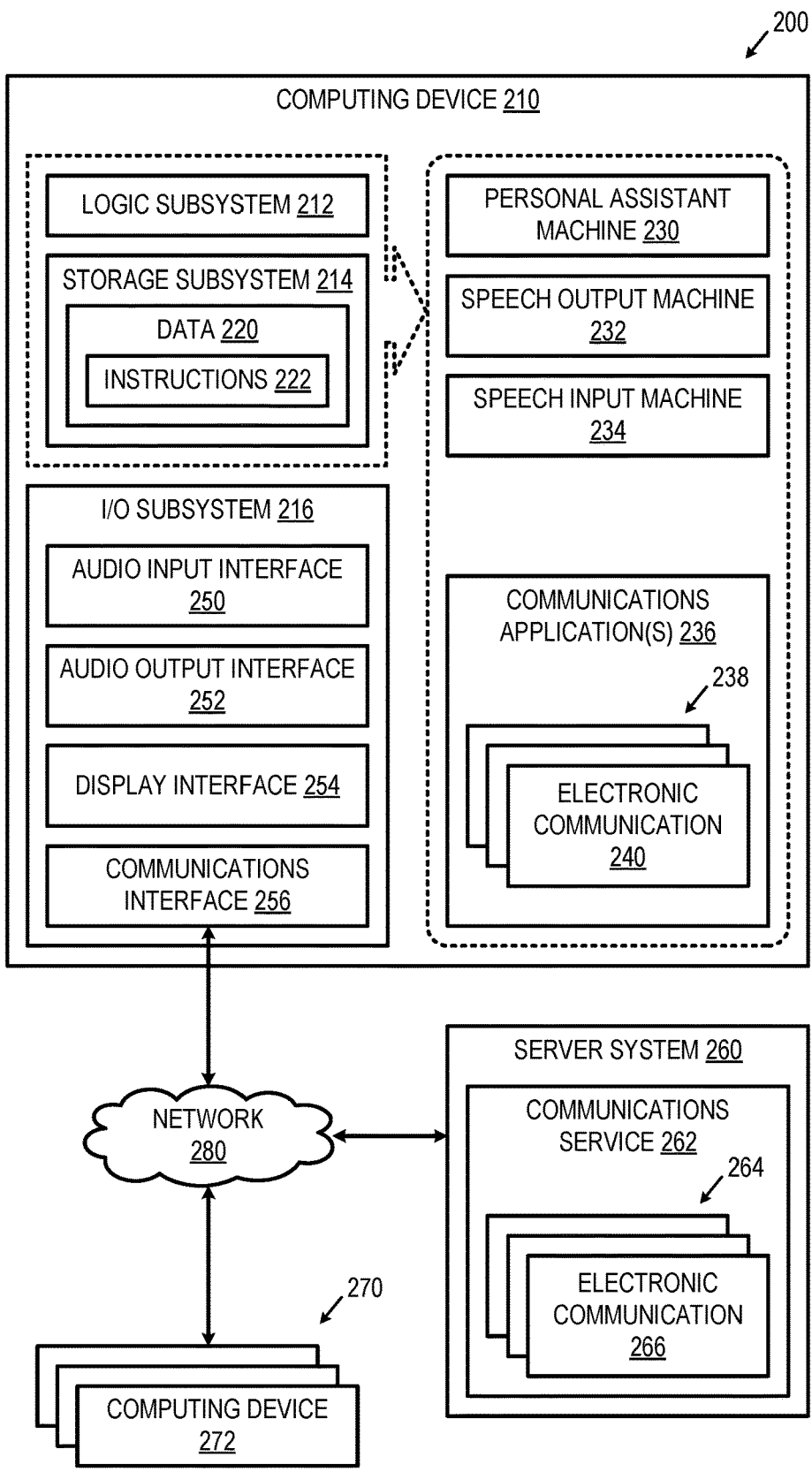
FIG. 2 schematically depicts an example computing system.

FIG. 2 schematically depicts an example computing system 200, including a computing device 210. Computing device 210 may take the form of a mobile computing device, a wearable computing device, a computing device integrated with a vehicle, a desktop computing device, a household appliance computing device, or other suitable device, as examples. Device 120 of FIG. 1 is one example of computing device 210. Computing device 210 includes a logic subsystem 212, a storage subsystem 214, an input/output (I/O) subsystem 216, and/or other suitable components not shown in FIG. 2.

Logic subsystem 212 includes one or more physical devices (e.g., a processor) configured to execute instructions. Storage subsystem 214 includes one or more physical devices (e.g., memory) configured to hold data 220, including instructions 222 executable by logic subsystem 212 to implement the methods and operations described herein.

Additional aspects of logic subsystem 212 and storage subsystem 214 are described below.

As shown in FIG. 2, logic subsystem 212 and storage subsystem 214 may cooperate to instantiate one or more functional components, such as a personal assistant machine 230, a speech output machine 232, a speech input machine 234, one or more communications applications 236, and/or other suitable components. As used herein, the term "machine" may be used to collectively refer to a combination of instructions 222 (e.g., firmware and/or software) with hardware and/or other suitable components that cooperate to provide the described functionality. While personal assistant machine 230, speech output machine 232, speech input machine 234, and/or communications applications 236 are described as being instantiated by cooperation of logic subsystem 212 and storage subsystem 214, in at least some examples, one or more of personal assistant machine 230, speech output machine 232, speech input machine 234, and/or communications applications 236 may be instantiated in whole or in part by a remote computing device or system, such as a server system 260. Accordingly, the methods or operations described herein may be performed locally at computing device 210, remotely at server system 260, or may be distributed between one or more computing device(s) 210 and/or one or more server system(s) 260.

Personal assistant machine 230 is one example of a conversational computing interface. However, a conversational computing interface may take other suitable forms. Accordingly, it will be understood that the various features and techniques described herein with reference to a personal assistant machine may be applicable to other forms of a conversational computing interface. A device, such as computing device 210 or computing system 200, that implements personal assistant machine 230 may be referred to as a personal assistant device. Similarly, a device, such as a computing device or computing system that implements another form of a conversational computing interface may be referred to as a conversational computing interface device, such as previously described with respect to device 120 of FIG. 1.

Personal assistant machine 230 may engage in a dialog with a user by receiving and processing spoken commands of the user to perform tasks, including outputting information to the user. As an example, personal assistant machine 230 may output an audio presentation of a plurality of conversation threads and/or electronic communications for a recipient according to a presentation order. Personal assistant machine 230 may include natural language processing, thereby supporting a natural language interface by which a user may interact with computing device 210.

Speech output machine 232 receives data, such as machine-readable data and/or text-based data from personal assistant machine 230 to be output to the user, and converts such data into audio data containing speech having natural language components. In an example, speech output machine 232 may provide text-to-speech conversion. For example, personal assistant machine 230 may provide select portions of text content of an electronic communication to speech output machine 232 to convert the text content into an audible output of the text content for audible consumption by the user. In FIG. 1, for example, device 120 outputs "GOAL! Can you believe it's already World Cup time?", which is an audible output of text content of an electronic communication of which user 110 is a recipient.

Speech input machine 234 receives audio data representing human speech, and converts the audio data into machine-readable data and/or text data that is usable by personal assistant machine 230 or other suitable components of computing device 210. In an example, speech input machine 232 may provide speech-to-text conversion. In FIG. 1, for example, conversational computing interface device 120 receives and processes the spoken commands of user 110, including "Read messages" and "Next conversation" via speech input machine 234.

The one or more communications applications 236 may support the sending and receiving of electronic communications 238, of which electronic communication 240 is an example. A communication application may support one or more types of electronic communications, including email, text/SMS messages, real-time/instant messages, multimedia messages, social networking messages, messages within multi-player video games, and/or any other type of electronic communication. Personal assistant machine 230 may interface with communications applications 236, enabling the personal assistant machine to receive, process, and send electronic communications of one or more different types on-behalf of a user.

I/O subsystem 216 may include one or more of an audio input interface 250, an audio output interface 252, a display interface 254, a communications interface 256, and/or other suitable interfaces.

Computing device 210 receives audio data representing audio captured via audio input interface 250. Audio input interface 250 may include one or more integrated audio microphones and/or may interface with one or more peripheral audio microphones. For example, computing device 210 may receive audio data representing user speech captured via audio input interface 250, such as user speech 130 of FIG. 1. Audio data from audio input interface 250 may be provided to speech input machine 234 and/or personal assistant machine 230 for processing. Audio input interface 250 may be omitted in at least some examples.

Computing device 210 outputs audio representing audio data via audio output interface 252. Audio output interface 252 may include one or more integrated audio speakers and/or may interface with one or more peripheral audio speakers. For example, computing device 210 may output an audio representation of speech having natural language components via audio output interface 252, such as device speech 140 of FIG. 1. Audio data may be provided by speech output machine 232, personal assistant machine 230, or other suitable component of computing device 210 to audio output interface 252 for output as an audible output of the audio data. Audio output interface 252 may be omitted in at least some examples.

Computing device 210 may output graphical content representing graphical data via display interface 254. Display interface 254 may include one or more integrated display devices and/or may interface with one or more peripheral display devices. Display interface 254 may be omitted in at least some examples.

Computing device 210 may communicate with other devices such as server system 260 and/or other computing devices 270 via communications interface 256, enabling computing device 210 to send electronic communications to and/or receive electronic communications from the other devices. Communications interface 256 may include one or more integrated transceivers and associated communications hardware that support wireless and/or wired communications according to any suitable communications protocol. For example, communication interface 256 may be configured for communication via a wireless or wired telephone network and/or a wireless or wired personal-area network, local-area network, and/or wide-area network (e.g., the Internet, a cellular network, or a portion thereof) via a communication network 280. Communications interface 256 may be omitted in at least some examples.

I/O subsystem 216 may further include one or more additional input devices and/or output devices in integrated and/or peripheral form. Additional examples of input devices include user-input devices such as a keyboard, mouse, touch screen, touch pad, game controller, and/or inertial sensors, global positioning sensors, cameras, optical sensors. Additional examples of output devices include vibration motors and light-emitting indicators.

Computing system 200 may further include server system 260 of one or more server computing devices. Computing system 200 may further include a plurality of other computing devices 270 of which computing device 272 is an example. Server system 260 may host a communications service 262 that receives, processes, and sends electronic communications between or among senders and recipients addressed by the electronic communications. For example, users may operate computing devices 210 and 270 to send or receive electronic communications via communications service 262. Communications service 262 is depicted including a plurality of electronic communications 264 of which electronic communication 266 is an example. Electronic communication 266 may be received from computing device 272 via network 280 for processing and/or delivery to computing device 210 via network 280 in an example. One or more of communications applications 236 may be configured for coordinated operation with communications service 262 enabling electronic communications to be sent, received, and/or processed for senders and recipients as users of computing devices 210 and 270.

Figure 3:
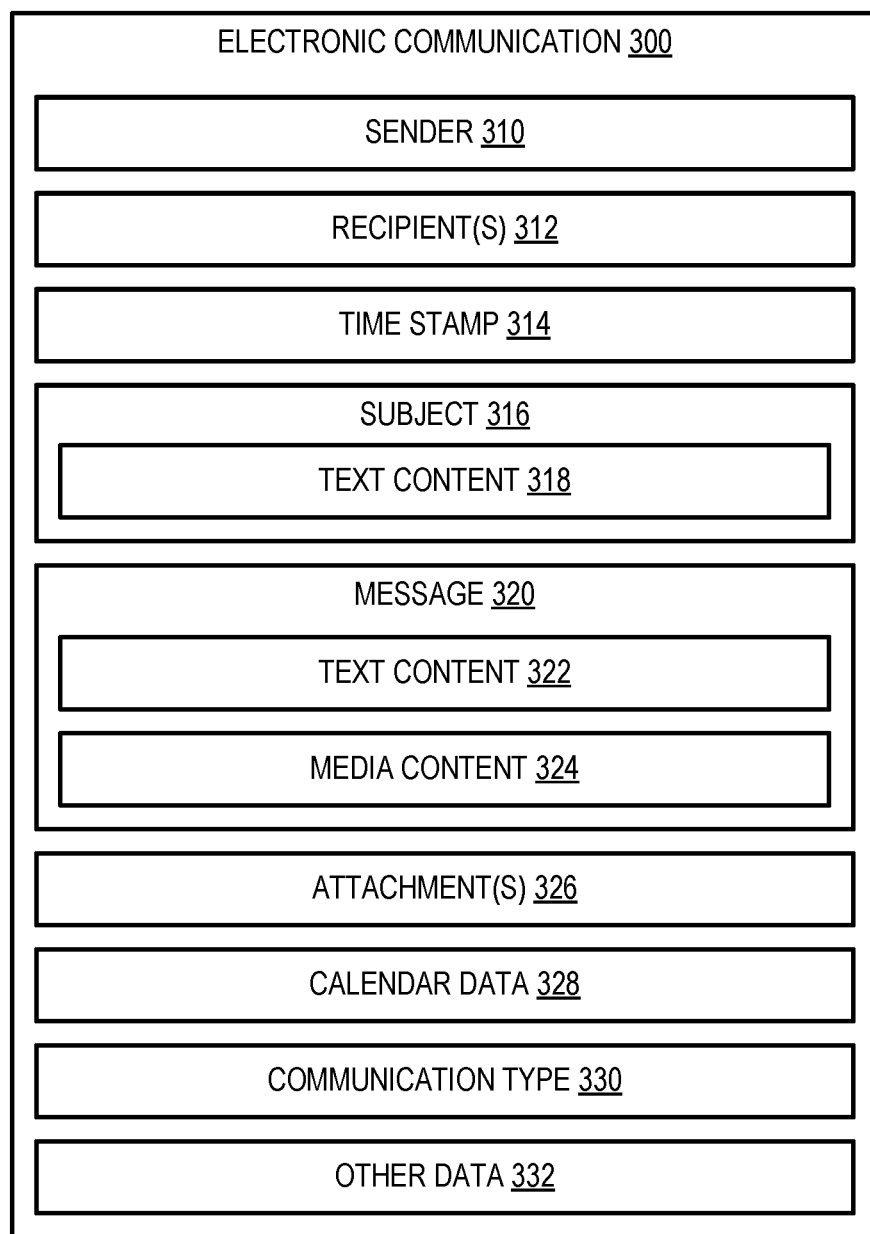
FIG. 3 schematically depicts an example electronic communication.

FIG. 3 schematically depicts an example electronic communication 300. Electronic communications 240 and 266 of FIG. 2 are examples of electronic communication 300. In an example, electronic communication 300 takes the form of data that includes or identifies a sender 310, one or more recipients 312, a timestamp 314 indicating a timing (e.g., a clock time and a date of transmission or reception) of receipt or transmission of the electronic communication, a subject 316 which may include text content 318, a message 320 (i.e., a message body) which may include text content 322 and/or media content 324, one or more attachments 326, calendar data 328, a communication type 330, and/or other data 332 (e.g., metadata). Electronic communication 300 is provided as a nonlimiting example. The present disclosure is compatible with virtually any type of electronic communication, regardless of the contents of the electronic communication that may be specific to that type of electronic communication. As such, various aspects of the electronic communication may optionally be omitted, and/or various aspects that are not illustrated may be included.

In an example, a user acting as a sender of electronic communication 300 may define, through user input, one or more of recipients 312, subject 316 including text content 318, message 320 including text content 322 and/or media content 324, attachments 326, calendar data 328, and/or other data 332 of electronic communication 300. Timestamp 314 may be assigned by the communications application or communications service as a timing of transmission or reception of electronic communication 300. Communication type 330 may be dependent upon the communications application or service used by the sender, or may be defined or otherwise selected by user input of the sender in the case of a communications application or service that supports multiple communication types.

Figure 4:
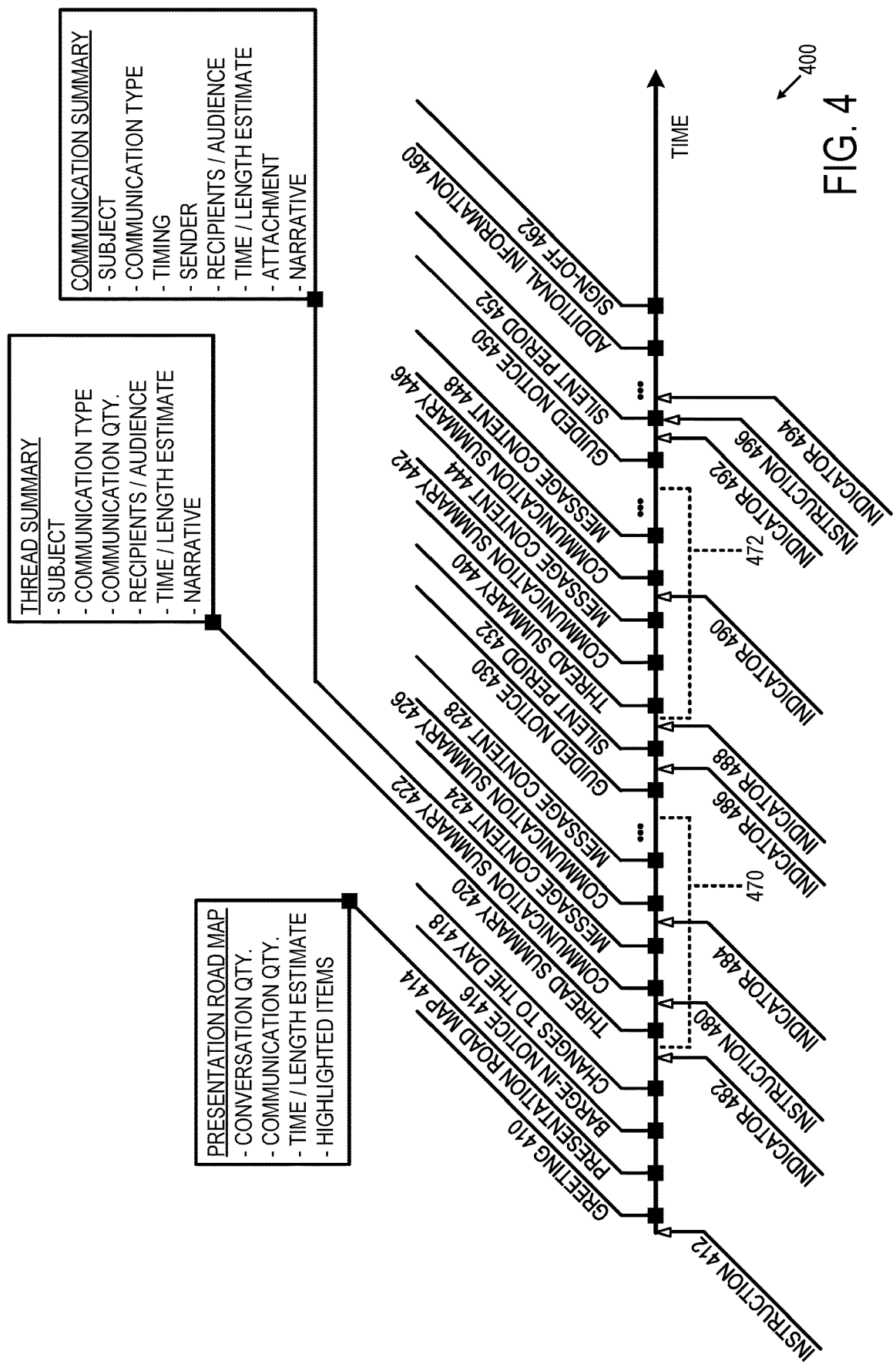
FIG. 4 depicts an example timeline of an audio presentation output by a personal assistant device.

FIG. 4 depicts an example timeline 400 of an audio presentation output by a personal assistant device or other suitable conversational computing interface device, such as devices 120 of FIG. 1 or device 210 and/or computing system 200 of FIG. 2. Within timeline 400, time advances from a left-hand side of the figure to a right-hand side of the figure. Timeline 400 may be instantiated from a predefined template that may be implemented by the personal assistant device disclosed herein. Accordingly, the audible outputs described with respect to timeline 400 may be omitted, repeated, or presented in a different order in other examples. Furthermore, additional audible outputs may be included in place of or between the audible outputs of timeline 400.

At 410, a greeting may be presented as an audible output. In an example, the greeting may be presented in response to an instruction 412 received by the personal assistant device to initiate presentation of unreviewed electronic communications for a recipient. Instruction 412 may take the form of a spoken command by a user or other type of user input received by the personal assistant device. For example, in FIG. 1, user 110 provides an instruction "Read messages" as a spoken command, and device 120 responds by presenting the greeting "Hi Sam!".

At 414, a presentation roadmap may be presented as an audible output. The presentation roadmap may identify one or more of: a quantity of conversation threads that include one or more unreviewed electronic communications for the recipient, a quantity of the unreviewed electronic communications, a time estimate of the audio presentation for presenting the conversation threads that include unreviewed electronic communications, a length estimate of the unreviewed electronic communications, one or more highlighted items, and/or other suitable information. The one or more highlighted items may include a narrative that describes the contents of one or more of the unreviewed electronic communications.

At 416, a barge-in notice may be presented as an audible output. The barge-in notice may be used to notify the user that a spoken command may be provided by the user to perform an action with respect to the audio presentation or its contents. Referring to the example of FIG. 1, the personal assistant device may present the audible output "Feel free to interrupt" as an example of the barge-in notice presented at 416.

At 418, one or more changes to the day of the user may be presented as an audible output. Changes to the day may include updates to the user's calendar, and optionally may be derived from calendar data of one or more of the unreviewed electronic communications.

As described in further detail with reference to FIGS. 5-7, electronic communications for a recipient may be organized into conversation threads in which each conversation thread includes two or more reply-linked electronic communications. By organizing electronic communications into conversation threads, a user listening to an audio presentation of the electronic communications may be better able to comprehend or track a dialog between or among senders and recipients of the electronic communications that form part of the same conversation thread. By contrast, presenting electronic communications according only to their chronological order without regard to the context of the conversation may be more difficult for a user to comprehend or track dialogs between or among senders and recipients, particularly within the context of audio presentation of such communications.

A first conversation thread that includes one or more unreviewed electronic communications for the user may be presented at 470, including a conversation thread summary 420 of the first conversation thread, a communication summary 422 for each unreviewed electronic communication of the first conversation thread, and message content 424 for each unreviewed electronic communication of the first conversation thread.

At 420, the conversation thread summary for the first conversation thread may be presented as an audible output. The conversation thread summary may identify one or more of: a subject of the conversation thread as identified from an electronic communication of the conversation thread, a type of the electronic communications of the conversation thread, a quantity of unreviewed electronic communications of the conversation thread, recipients and/or an audience (e.g., quantity, identities of the recipients, and/or a quantity/identity of recipients that were added or removed in relation to prior reply-linked communications) of the conversation thread as identified from an electronic communication of the conversation thread, a time estimate of a portion of the audio presentation for presenting the unreviewed electronic communications of the conversation thread, a length estimate of the unreviewed electronic communications of the conversation thread, a narrative that describes the contents of one or more of the unreviewed electronic communications of the conversation thread and/or other suitable information.

In an example, the time and/or length estimate of the conversation thread summary may include a length warning. Referring to the example of FIG. 1, the personal assistant device may present the audible output "long conversation" as an example of a length warning.

At 422, a first communication summary for a first unreviewed electronic communication of the first conversation thread may be presented as an audible output. The communication summary may identify one or more of a subject of the electronic communication, a type of the electronic communication, a timing of the electronic communication based on the timestamp of the electronic communication, a sender of the electronic communication, recipients and/or an audience of the electronic communication, a time estimate of a portion of the audio presentation for presenting the electronic communication, a length estimate of the electronic communication, an indication of whether one or more attachments are included with the electronic communication, a narrative that describes the contents of the electronic communication, and/or other suitable information.

At 424, message content of the first unreviewed electronic communication of the first conversation thread may be presented as an audible output. For example, an audible output of the text content of the message of the first unreviewed electronic communication may be presented in part or in its entirety at 424. In FIG. 1, for example, device 120 outputs an audible output of text content of an electronic communications as "GOAL! Can you believe it's already World Cup time?". In at least some examples, the personal assistant device may select one or more portions of the text content to include in the audible output and/or exclude from the audible output. For example, the personal assistant device may refrain from audibly outputting text content of signature blocks at a conclusion of a message or web domain addresses included within the message. Text content may be audibly output as an audible reproduction of its text to provide a literal reading of the text content in some examples. In other examples, text content may be intelligently edited by the personal assistant device to provide an improved listening experience for the user, including correcting spelling/grammatical errors in the text content, reordering text components of the text content, and/or summarizing the text content in the audible output.

Following presentation of the first unreviewed electronic communication, the audio presentation may proceed to a second unreviewed electronic communication of the first conversation thread. For example, at 426, a second communication summary for a second unreviewed electronic communication of the first conversation thread may be presented as an audible output. At 428, message content of the second unreviewed electronic communication of the first conversation thread may be presented as an audible output. The audio presentation may proceed sequentially through each unreviewed electronic communication of the first conversation thread. In at least some examples, the unreviewed electronic communications of a conversation thread may be presented according to a chronological-sequential order based on the respective timestamps of the unreviewed electronic communications, beginning with the oldest unreviewed electronic communication and continuing through to the most recent unreviewed electronic communication of the conversation thread.

At 430, a guided notice may be presented as an audible output. The guided notice may be used to inquire whether the user would like to perform an action with respect to the first conversation thread. As an example, the guided notice may provide a general notice to the user, such as "perform an action or proceed to the next conversation?" or may provide targeted notices, such as "would you like to reply to this conversation?". At 432, a silent period may be provided to enable the user to provide an instruction or otherwise take action with respect to the conversation thread before proceeding to the next conversation thread of the audio presentation.

Following presentation of the first conversation thread at 470, the audio presentation may proceed to presenting a second conversation thread at 472 that includes one or more unreviewed electronic communications for the recipient. Presentation of the second conversation thread may similarly include presentation of a thread summary for the second conversation thread at 440, a communication summary for a first unreviewed electronic communication of the second conversation thread at 442, message content of the first unreviewed electronic communication of the second conversation thread at 444, a communication summary for a second unreviewed electronic communication of the second conversation thread at 446, message content of the second unreviewed electronic communication of the second conversation thread at 448, etc., until each unreviewed electronic communication of the second conversation thread has been presented as an audible output.

The audio presentation may proceed through each conversation thread that includes one or more unreviewed electronic communications for the recipient, as previously described with reference to the presentation of the first conversation thread at 470. Following presentation of the conversation threads that included one or more unreviewed electronic communications, additional information that the personal assistant device determines as being potentially relevant to the user may be presented as an audible output at 460. At 462, the user may be signed-off from the audio presentation session by the personal assistant device.

Continuing with the example timeline of FIG. 4, a user may provide an instruction to the personal assistant device to navigate within the audio presentation or among conversation threads and their electronic communications. For example, responsive to instruction 480, the personal assistant device may advance the audio presentation from presenting communication summary at 422 to presenting thread summary at 440 of the second conversation thread, thereby enabling the user to skip presentation of some or all of the first conversation thread. In FIG. 1, user 110 provided the spoken command "Next conversation", as an example of instruction 480. As another example, responsive to instruction 480, the personal assistant device may advance the audio presentation from presenting communication summary at 422 for the first unreviewed electronic communication to presenting communication summary at 426 for the second unreviewed electronic communication, thereby enabling the user to skip presentation of some or all of the first unreviewed electronic communication.

By organizing electronic communications into conversation threads, a user may perform an action with respect to the electronic communications of that conversation thread. For example, as described above, a user may skip audio presentation of a particular conversation thread, including the unreviewed electronic communications of the conversation thread, by providing a spoken command, such as "Next conversation" of FIG. 1. As another example, a user may delete electronic communications of a conversation thread or mark such electronic communications as important by providing a spoken command, such as instruction 496 within silent period 452. Accordingly, the personal assistant device may apply an action to each of a plurality of electronic communications of a conversation thread responsive to a spoken command by a user.

In at least some examples, audible indicators may be presented as an audible output by the personal assistant device to notify the user of transitions between portions of the audio presentation. For example, audible indicator 482 may be presented between presentation of the changes to the day at 418 and the thread summary at 420, audible indicators 484 and 490 may be presented between electronic communications, audible indicators 486 and 492 may be presented between the guided notice and the silent period, and audible indicators 488 and 494 may be presented between the silent period and a subsequent conversation thread and the additional information presented at 460 or sign-off at 462. An audible indicator may take the form of an audible tone or any suitable sound. Audible indicators having distinguishable sounds may be presented at different portions of the audio presentation. For example, audible indicator 484 identifying a transition between electronic communications may differ from audible indicator 488 identifying a transition between conversation threads. Such audible indicators may help a user easily understand whether the personal assistant device has started or completed a particular portion of the audio presentation, whether the personal assistant device has completed a particular action as instructed by the user, or whether the personal assistant device is currently listening for an instruction to be provided by the user.

The personal assistant device may support various presentation modes, including a continuous presentation mode and a guided presentation mode. In the continuous presentation mode, the personal assistant device may proceed through the audio presentation in the absence of instructions from the user. In the guided presentation mode, the personal assistant device may pause the audio presentation at transition points to await an instruction from the user to proceed. For example, in the guided presentation mode, the personal assistant device may pause the audio presentation and output the inquiry: "Would you like to hear this conversation thread" following presentation of the conversation summary.

FIG. 5 depicts an example timeline 500 of electronic communications. Within timeline 500, time advances from a left-hand side of the figure to a right-hand side of the figure. A timing of each electronic communication within FIG. 5 may correspond to a respective timestamp of that electronic communication, such as described with reference to timestamp 314 of FIG. 3.

Timeline 500 is divided into multiple conversation threads 510-520, each including one or more electronic communications of a recipient. In this example, conversation thread 510 includes electronic communications 530-540, conversation thread 512 includes electronic communications 550-558, conversation thread 514 includes electronic communications 560-564, conversation thread 516 includes electronic communication 570, conversation thread 518 includes electronic communication 580, conversation thread 520 includes electronic communications 590-594.

Multiple electronic communications of a conversation thread may be referred to as being reply-linked electronic communications in which one or more electronic communications are replies to an original electronic communication, thereby linking these electronic communications to each other by a common conversation thread. A first electronic communication that is a reply to an earlier second electronic communication which in-turn is a reply to an even earlier third electronic communication may be considered as being reply-linked to both the second and third electronic communications, thereby forming a common conversation thread. For example, electronic communication 534 is a reply to electronic communication 532, which in-turn is a reply to electronic communication 530. Therefore, each of electronic communications 530, 532, and 534 form part of conversation thread 510. For some types of electronic communications, such as collaborative messaging platforms or multi-player gaming platforms, electronic communications associated with a particular channel (e.g., a particular collaborative project or multi-player game) may be identified as being reply-linked to each other.

Furthermore, in this example, electronic communications 530-540, 554-558, 560-564, 570, and 594 are unreviewed electronic communications of the recipient. By contrast, electronic communications 550, 552, 580, and 590 are previously reviewed electronic communications of the recipient. In an example, an electronic communication may be referred to as an unreviewed electronic communication if its message (e.g., message 320 of FIG. 3) of the electronic communication has not been presented to the recipient user through any of visual, audible, or other (e.g., braille) modes of presentation. For example, within the context of email, individual email messages may be marked as "read" or "unread", which may correspond to electronic communications being previously reviewed or unreviewed. Within the example of FIG. 5, electronic communication 592 corresponds to a reply by the recipient to previous electronic communication 590.

As described with reference to the example dialog between user 110 and device 120 of FIG. 1, multiple conversation threads may be presented according to a particular presentation order. In at least some examples, a presentation order by which two or more conversation threads are presented may be based on a timing of an unreviewed electronic communication of each conversation thread. In the example of FIG. 5, electronic communications 530-540 of conversation thread 510 are each received after each of electronic communications 550-558 of conversation thread 512, whereas electronic communications 560-564 of conversation thread 514 are interspersed in time with electronic communications of conversation threads 510 and 512.

In a first example presentation order, conversation threads may be presented according to a reverse chronological-sequential order based on a latest unreviewed electronic communication of each conversation thread. In the example timeline of FIG. 5, conversation thread 510 may be presented before conversation threads 512, 514, 516, and 520 because conversation thread 510 includes the latest unreviewed electronic communication 540 having a timing that is after latest unreviewed electronic communications 558, 564, 570, and 594 of conversation threads 512, 514, 516, and 520, respectively. This first example presentation order may be used to prioritize conversation threads that have the most recent activity in terms of unreviewed electronic communications being received for the recipient. Conversation thread 518 may not be presented in this example, because conversation thread 518 does not include any unreviewed electronic communications.

FIG. 6 depicts an example timeline 600 of the first example presentation order described above with respect to the electronic communications of FIG. 5, in the absence of a user instruction to advance or interrupt presentation of the conversation threads. Within timeline 600, time advances from a left-hand side of the figure to a right-hand side of the figure. Conversation threads 510-516 and 520 are presented within FIG. 6 according to a reverse chronological-sequential order based on a latest unreviewed electronic communication of each conversation thread. Within each conversation thread, unreviewed electronic communications may be presented in chronological-sequential order beginning with an earliest unreviewed electronic communication of the conversation thread and continuing through to the latest unreviewed electronic communication of that conversation thread, again in the absence of a user instruction to advance or interrupt presentation of the conversation threads. For example, according to the first example presentation order depicted in FIG. 6, unreviewed electronic communications of FIG. 5 received according to the following order: 560, 554, 594, 556, 558, 562, 530, 532, 570, 534, 564, 536, 538, 540 are presented in the following order: electronic communications 530-540 of conversation thread 510, electronic communications 560-564 of conversation thread 514, electronic communication 516 of conversation thread 570, electronic communications 554-558 of conversation thread 512, and electronic conversation 594 of conversation thread 520.

Returning to FIG. 5, in a second example presentation order, conversation threads may be presented according to a chronological-sequential order based on a latest unreviewed electronic communication of each conversation thread. This will result in the opposite ordering of conversation threads compared to the reverse-chronological-sequential order described above. For example, in the example timeline of FIG. 5, conversation thread 512 may be presented before conversation threads 510 and 514, because conversation thread 512 includes latest unreviewed electronic communication 558 having a timing that is before latest unreviewed electronic communications 540 and 564 of conversation threads 510 and 514, respectively.

In a third example presentation order, conversation threads may be presented according to a reverse chronological-sequential order based on a timing of an earliest unreviewed electronic communication of each conversation thread. In the example timeline of FIG. 5, conversation thread 510 may be presented before conversation threads 512 and 514, because conversation thread 510 includes earliest unreviewed electronic communication 530 having a timing that is after earliest unreviewed electronic communications 554 and 560 of conversation threads 512 and 514, respectively.

In a fourth example presentation order, conversation threads may be presented according to a chronological-sequential order based on a timing of an earliest unreviewed electronic communication of each conversation thread. In the example timeline of FIG. 5, conversation thread 514 may be presented before conversation threads 510 and 512, because conversation thread 514 includes earliest unreviewed electronic communication 560 having a timing that is before earliest unreviewed electronic communications 530 and 554 of conversation threads 510 and 512, respectively.

In a fifth example presentation order, conversation threads that include a reply by the recipient at some point within the thread may be prioritized in the presentation order over conversation threads that do not include a reply by the recipient. In the example timeline of FIG. 5, unreviewed electronic communication 594 of conversation thread 520 may be presented before electronic communications of conversation threads 510-516, because conversation thread 520 includes reply electronic communication 592 by the recipient. The presence of reply electronic communication 592 in conversation thread 520 may indicate heightened importance of conversation thread 520 as compared to other conversation threads. Among multiple conversation threads that each include a reply by the recipient, the presentation order of unreviewed electronic communications may utilize any of the first, second, third, or fourth example presentation orders discussed above for presenting conversation threads that include a reply by the recipient prior to presenting unreviewed electronic communications of conversation threads that do not include a reply by the recipient.

In a sixth example presentation order, prioritization of conversation threads having a reply by the recipient, such as described above with respect to the fifth example presentation order, may consider only those replies by the recipient for which an unreviewed electronic communication is a reply directly to that reply of the recipient. This presentation order may be used to prioritize conversation threads that include unreviewed electronic communications that are directly reply-linked to replies of the recipient over other conversation threads.

In a seventh example presentation order, conversation threads may be prioritized based on one or more factors, including the content of the subject, message, or attachment of the electronic communications, the senders of the electronic communications, the quantity of electronic communications per conversation thread, the frequency of electronic communications per conversation thread, or the presence of importance indicators (e.g., flags) associated with the electronic communications. In an example, conversation threads may be ranked according to the one or more factors, and may be presented in an order that is based on the ranking of the conversation threads. Such ranking may be based on any desired heuristics, machine learning algorithms, or other ranking methodologies.

Figure 7A:
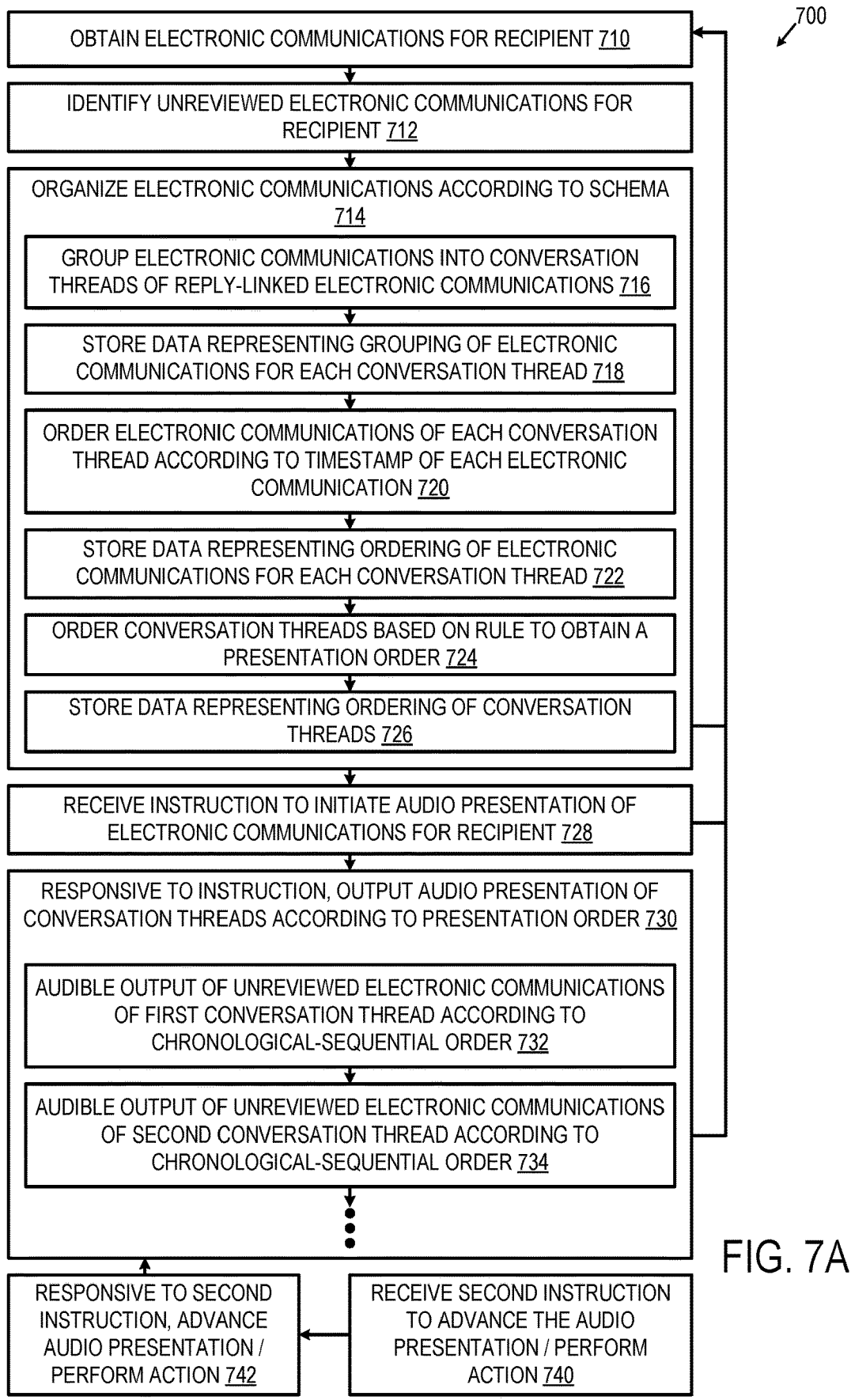
FIG. 7A depicts a flow diagram of an example method for organizing and presenting conversation threads.

FIG. 7A depicts a flow diagram of an example method 700 for organizing and presenting conversation threads. Method 700 or portions thereof may be performed by one or more computing devices of a computing system. For example, method 700 may be performed by computing device 210 of FIG. 2, or by a computing system that includes computing device 210 in combination with server system 260 of FIG. 2.

At 710, electronic communications are obtained for a recipient. In an example, the electronic communications may be obtained at a computing device of a user from a remote server system via a communications network. The electronic communications obtained for the recipient at 710 may span one or more types of electronic communications, and may be collected from one or more communications services and/or applications. Furthermore, the electronic communications obtained at 710 may refer to a subset of all electronic communications of the recipient. For example, the electronic communications obtained at 710 may include a primary or focused inbox or folder of the recipient, and may exclude other inboxes or folders such as junk mail, promotions, etc.

At 712, unreviewed electronic communications are identified for the recipient among the electronic communication obtained at 710. As previously described with reference to FIG. 5, an electronic communication may be referred to as an unreviewed electronic communication if its message (e.g., message 320 of FIG. 3) of the electronic communication has not been presented to the recipient user through any of visual, audible, or tactile (e.g., braille) modes of presentation. In an example, an identifier indicating whether an electronic communication is reviewed or unreviewed may be stored as metadata of the electronic communication. In another example, the identifier may be stored at the communications application or service from which the electronic communication is obtained, and may be reported by the application or service with the electronic communication.

At 714, electronic communications obtained at 710 are organized according to a schema. The schema may be programmatically defined by one or more of a communications application of the user's computing device, by a communications service of a server system, or by a personal assistant machine, depending on implementation. For example, some communications services or applications may organize or partially organize electronic communications into conversation threads, whereas other communications services or applications may not support the use of conversation threads.

At 716, electronic communications obtained at 710 may be grouped into a plurality of conversation threads containing two or more reply-linked electronic communications. As previously described, two or more electronic communications are reply-linked if an electronic communication is a reply to an earlier electronic communication, and that an electronic communication may be reply-linked to an earlier electronic communication by one or more intermediate reply-linked electronic communications. Following operation 716, each conversation thread includes two or more electronic communications for the recipient that are reply-linked to each other. However, it will be understood that at least some conversation threads may include an individual electronic communication. At 718, data representing the grouping of electronic communications may be stored for each conversation thread. For example, data representing the grouping from operation 716 may be stored in a storage subsystem of a computing device, including locally at the user's computing device and/or at a remote server system.

At 720, electronic communications of each conversation thread may be ordered in chronological order according to a timestamp indicating a timing of each electronic communication. At 722, data representing the ordering of electronic communications may be stored for each conversation thread. For example, data representing the ordering from operation 722 may be stored in a storage subsystem of a computing device, including locally at the user's computing device and/or at a remote server system.

At 724, the conversation threads may be ordered based on a rule to obtain a presentation order among the conversation threads. As previously described with reference to the presentation order examples of FIG. 5, a variety of different presentation orders may be supported among conversation threads. According to the first example presentation order described in further detail with reference to FIG. 6, the rule applied at operation 724 may include identifying the most recent unreviewed electronic communication of each conversation thread, and ordering the conversation threads in reverse chronological order based on the timing of the most recent unreviewed electronic communications of the conversation threads. The rule applied at operation 724 may be defined to provide any of the example presentation orders described herein. At 726, data representing the ordering of conversation threads may be stored. For example, data representing the ordering from operation 724 may be stored in a storage subsystem of a computing device, including locally at the user's computing device and/or at a remote server system.

At 728, an instruction to initiate audio presentation of the electronic communications for the recipient is received. The instruction may take the form of a spoken command by a user, such as previously described with reference to FIG. 1 in which user speech 130 includes "Read messages". In at least some examples, a spoken command to initiate the audio presentation may include one or more keywords that are predefined at and recognizable by the personal assistant device, such as "Messages", "Play messages", "Read messages", "Hear messages", "Get mail", "tell me about my emails", What emails do I have?", "Did anyone email me?", "Do I have any new emails?", etc. In at least some examples, a user's intent to initiate the audio presentation by a particular spoken utterance may be inferred from context and/or may be learned from prior interaction with a user. For example, the personal assistant device may ask the user whether the user would like to initiate audio presentation of unreviewed electronic communications, to which the use may respond by speaking "yes" or "please". The instruction received at 728 may also include non-verbal commands, such as user inputs provided via any input device or interface of the user's computing device. Furthermore, in some examples, audio presentation of unreviewed electronic communications may be initiated in certain contexts by the personal assistant device without receiving an instruction. For example, the personal assistant device may initiate the audio presentation responsive to a particular operating condition, such as a scheduled time, a user picking up the personal assistant device, reception of a new unreviewed electronic communication, etc.

At 730, responsive to the instruction received at 728, an audio presentation of the conversation threads is output according to the presentation order obtained at operation 724. The presentation order may be defined by one or more of the grouping of electronic communications at 716, the ordering of electronic communications at 720, and the ordering of conversation threads at 724, and may be based on the data stored at 718, 722, and 726.

In an example, the audio presentation includes unreviewed electronic communications of each conversation thread in a chronological-sequential order beginning with an oldest unreviewed electronic communication and continuing to a most recent unreviewed electronic communication of the conversation thread before another of the plurality of conversation threads that includes an unreviewed electronic communication that is interspersed in time between the oldest unreviewed electronic communication and the most recent unreviewed electronic communication of the conversation thread. For example, at 732, two or more unreviewed electronic communications of a first conversation thread are audibly output according a chronological sequential order before unreviewed electronic communications of a second conversation thread at 734.

Furthermore, in an example, the presentation order of the conversation threads may be a reverse chronological-sequential order based on a most recent unreviewed electronic communication of each of the plurality of conversation threads such that the first conversation thread having a first most recent unreviewed electronic communication is presented at 732 before the second conversation thread having a second most recent unreviewed electronic communication that is older than the first most recent unreviewed electronic communication of the plurality of conversation threads. An example of this reverse chronological-sequential order is described with reference to FIG. 6.

The audio presentation output at 730 may include, for each unreviewed electronic communication, at least a portion of text content of a message of the unreviewed electronic communication presented as an audible output. In an example, all text content of the message of the unreviewed electronic communication may be presented as an audible output. Furthermore, in at least some examples, the audio presentation further includes, for each conversation thread of the plurality of conversation threads, a thread summary of the conversation thread presented as an audible output before the text content of the conversation thread. Examples of thread summaries presented before message content are described with reference to FIG. 4.

At 740, a second instruction to advance the audio presentation may be received. The instruction received at 740 may take the form of a spoken command of a user, such as previously described with reference to FIG. 1 in which user speech 130 includes "Next conversation". However, the instruction received at 740 may include non-verbal commands, such as user inputs provided via any input device or interface of the user's computing device.

At 742, responsive to the second instruction, the audio presentation of the plurality of conversation threads may be advanced from a current conversation thread to a subsequent conversation thread of the presentation order. It will be understood that other forms of navigation within the audio presentation may be supported by the personal assistant device, including ending the audio presentation, restarting the audio presentation, skipping to a next conversation thread, skipping to a particular conversation thread identified by the user, skipping a next unreviewed electronic communication, skipping to a particular unreviewed electronic communication identified by the user, etc.

The action of advancing audio presentation with respect to a conversation thread is one of a plurality of actions that may be supported by the personal assistant device. For example, operation 740 may instead include an instruction to perform a different action, such as replying to, forwarding on to another recipient, storing, or deleting the conversation thread, or marking the conversation thread as important (e.g., flagging the conversation thread or an electronic communication thereof). For at least some types of action, responsive to the instruction to perform the action, the action may be applied to each electronic communication of the conversation thread by the personal assistant device at 742. A spoken command used to initiate a particular action by the personal assistant device may include one or more keywords that are predefined at and recognizable by the personal assistant device, or an intent of a spoken utterance may be inferred by the personal assistant device from context, such as previously described with reference to the instruction received at 728.

Figure 7B:
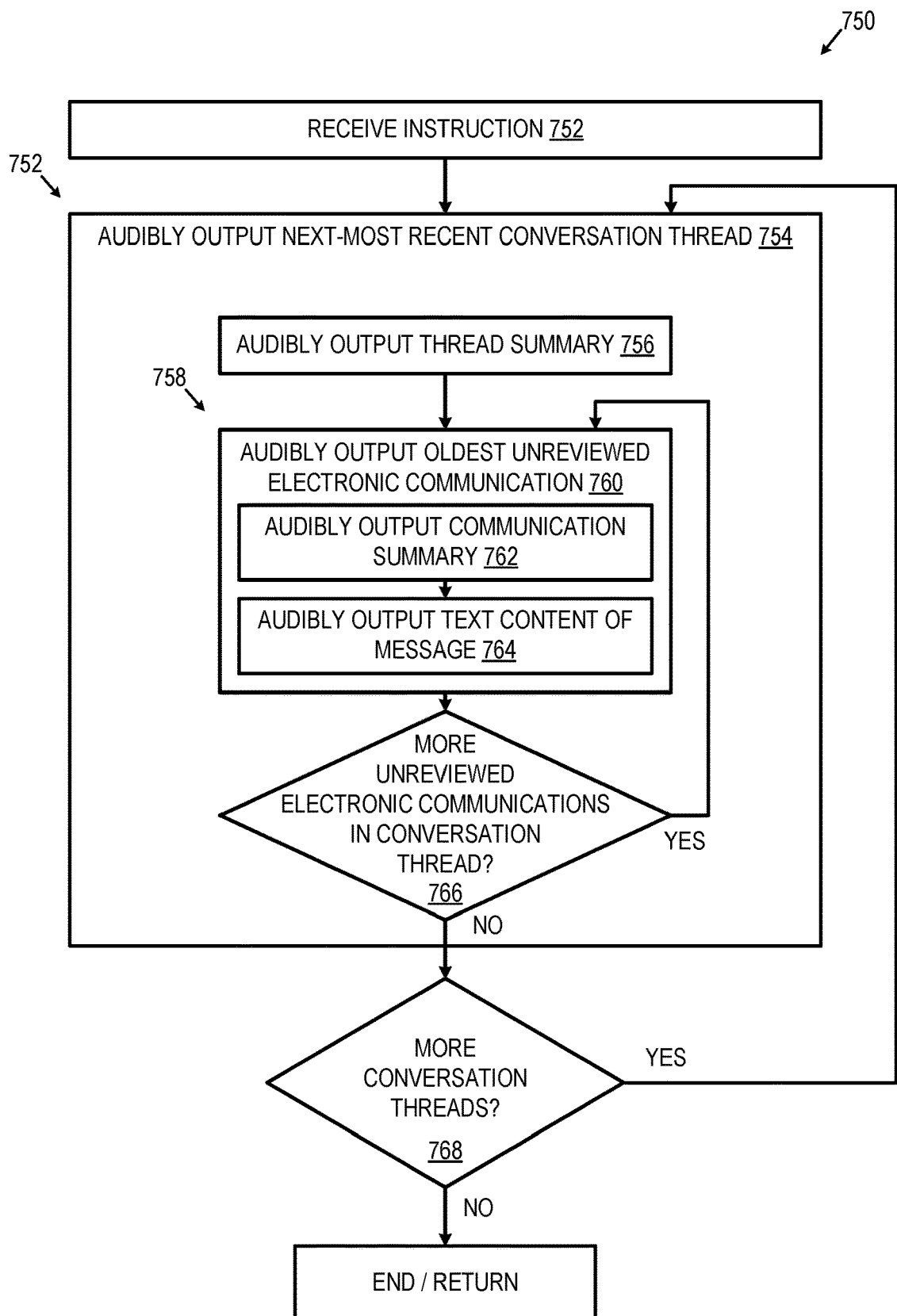
FIG. 7B depicts a flow diagram of an example method for presenting conversation threads.

FIG. 7B depicts a flow diagram of an example method 750 for presenting conversation threads. Method 750 may be performed in combination with method 700 of FIG. 7A. For example, method 750 or portions thereof may form part of operation 730 of method 700. Method 750 or portions thereof may be performed by one or more computing devices of a computing system. For example, method 700 may be performed by computing device 210 of FIG. 2, or by a computing system that includes computing device 210 in combination with server system 260 of FIG. 2.

At 752, an instruction may be received. For example, the instruction received at 752 may correspond to the instruction received at 728 of FIG. 7A. Responsive to the instruction, the method at 752 includes audibly outputting each unreviewed electronic communication in a most-recent conversation thread including a most-recent set of unreviewed, reply-linked electronic communications for the recipient. For example, the personal assistant device audibly outputs the next-most recent conversation thread at 754. As part of audibly outputting the next-most recent conversation thread at 754, the personal assistant device may audibly output the thread summary at 756. However, the thread summary may not be audibly output in other examples.

At 758, each unreviewed electronic communication in the most-recent conversation thread may be audibly output in a chronological-sequential order beginning with an oldest unreviewed electronic communication at 760. Audibly outputting the oldest unreviewed electronic communication at 760 may include audibly outputting the communication summary at 762 and audibly outputting some or all of the text content of the message at 764. However, the communication summary may not be audibly output in other examples.

At 766, if more unreviewed electronic communications are in the conversation thread, the method returns to 760 where the oldest unreviewed electronic communication is audibly output. Accordingly, the method continues to a most-recent unreviewed electronic communication, such as previously described with reference to the example presentation order of FIG. 6.

At 766, if there are no more unreviewed electronic communications in the conversation thread, the method proceeds to 768. At 768, if there are more conversation threads that include unreviewed electronic communications, the method may return to 754 where the next-most recent conversation thread is audibly output at 754. Accordingly, responsive to completing audible output of the most-recent unreviewed electronic communication from a conversation thread, the method includes audibly outputting each unreviewed electronic communication in a next-most-recent conversation thread including a next-most-recent set of unreviewed, reply-linked electronic communications for the recipient. Each unreviewed electronic communication in the next-most-recent conversation thread is audibly output at 758 in a chronological-sequential order beginning with an oldest unreviewed electronic communication and continuing to a most-recent unreviewed electronic communication.

As described, for example, with reference to FIGS. 4-6, at least one unreviewed electronic communication from the next-most-recent communication thread may be chronologically intermediate two unreviewed electronic communications from the most-recent conversation thread, and all of the unreviewed electronic communications from the most-recent conversation thread may be audibly output before any of the unreviewed electronic communications from the next-most-recent communication thread are audibly output through the use of method 750.

Figure 8:
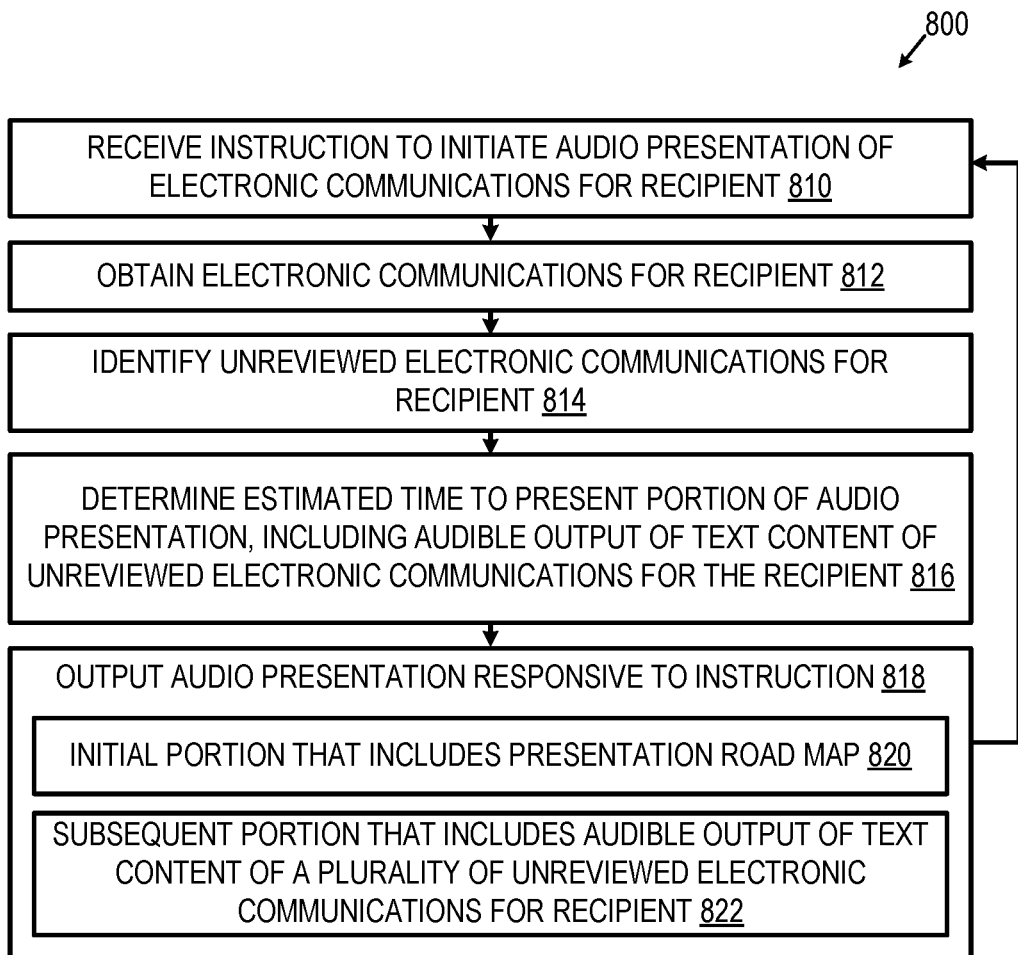
FIG. 8 depicts a flow diagram of an example method for presenting time identifying information for a conversation thread.

FIG. 8 depicts a flow diagram of an example method 800 for presenting time identifying information for a conversation thread. Method 800 or portions thereof may be performed by one or more computing devices of a computing system. For example, method 800 may be performed by computing device 210 of FIG. 2, or by a computing system that includes computing device 210 in combination with server system 260 of FIG. 2.

At 810, the method includes receiving an instruction to initiate audio presentation of electronic communications for a recipient. As previously described with reference to operation 728 of FIG. 7, the instruction may include a spoken command of a user.

At 812, electronic communications for the recipient are obtained. As previously described with reference to operation 710 of FIG. 7, electronic communications for the recipient may be obtained at a computing device of a user from a remote server system via a communications network.

At 814, unreviewed electronic communications for the recipient are identified. As previously described with reference to FIG. 5, an electronic communication may be referred to as an unreviewed electronic communication if its message (e.g., message 320 of FIG. 3) has not been presented to the recipient user through any of visual, audible, or other (e.g., braille) modes of presentation. In an example, an identifier indicating whether an electronic communication is reviewed or unreviewed may be stored as metadata of the electronic communication. In another example, the identifier may be stored at the communications application or service from which the electronic communication is obtained, and may be reported by the application or service with the electronic communication.

At 816, an estimated time is determined to present a portion of an audio presentation in which the portion includes audible output of text content of the unreviewed electronic communications for the recipient. The text content may include the text content of a message of each unreviewed electronic communication. As an example, the estimated time is determined based on a feature of the text content of the plurality of unreviewed electronic communications. The feature of the text content may include a word count or a character count of the text content, as examples; and the time estimate may be algorithmically computed based on the word or character count (e.g., 0.7 seconds per word). As another example, the method may further include converting the text content of the plurality of unreviewed electronic communications into audio data representing the audible output of the text content, determining the estimated time to present the subsequent portion of the audio presentation based on a feature of the audio data. The feature of the audio data may include an amount (e.g., a byte count) of the audio data or a duration of the audio data at a target presentation rate, as examples.

The estimate time may be determined based on other information contained in the audio presentation that is to be audibly output by the personal assistant device in the subsequent portion. For example, where the audio presentation includes thread summaries for each conversation thread, the estimated time may be determined further based on the duration of the thread summaries within the subsequent portion of the audio presentation.

In at least some examples, the estimated time identified by the presentation road map may take the form of a generalized time estimate. In the case of a generalized time estimate, operation 816 may further include determining an initial value for the estimated time, and selecting the generalized time estimate from a plurality of graduated generalized time estimates based on the initial value for the estimated time. The estimated time may be rounded to a generalized time estimate.

At 818, the audio presentation is output responsive to the instruction. Outputting the audio presentation includes outputting an initial portion of the audio presentation that includes a presentation road map 820, and a subsequent portion that includes the audible output of the text content of the plurality of unreviewed electronic communications for the recipient. In an example, the presentation road map output at 820 identifies the estimated time to present the subsequent portion of the audio presentation output at operation 822, which corresponds to the portion for which the estimate time was determined at operation 816.

The presentation road map output at 818 may identify other features of the audio presentation, such as previously described with reference to FIG. 4. As an example, the presentation road map may further identify a quantity of the unreviewed electronic communications and/or a quantity of conversation threads for the unreviewed electronic communications.

Aspects of method 800 may be similarly performed to present an estimated time in a thread summary for a conversation thread containing one or more reply-linked electronic communications or for a communication summary of an individual electronic communication, such as described with reference to FIG. 4.

As introduced above, there are many scenarios in which it may be beneficial for a user to audibly review electronic communications. However, most electronic communications are not designed for audible presentation. To the contrary, electronic communications have conventionally been visually presented using a graphical user interface. Merely outputting a verbatim audible reproduction of certain types of message content may not provide a favorable user experience. Verbatim reproductions may be incomprehensible and/or longer in duration than desired. For example, large data tables may take an impractically long time to read verbatim and may be difficult to comprehend. As another example, long Uniform Resource Locators (URLs) may not provide useful information when read verbatim. As described herein, certain types of message content may be summarized, simplified, and/or omitted to improve the user experience of consuming the message content in audible form. Furthermore, a user may optionally be provided with a notice of features that may not be suitable for audio presentation, thus allowing the user to make an informed decision as to whether a particular electronic communication instead should be visually reviewed at a later time.

Figure 9:
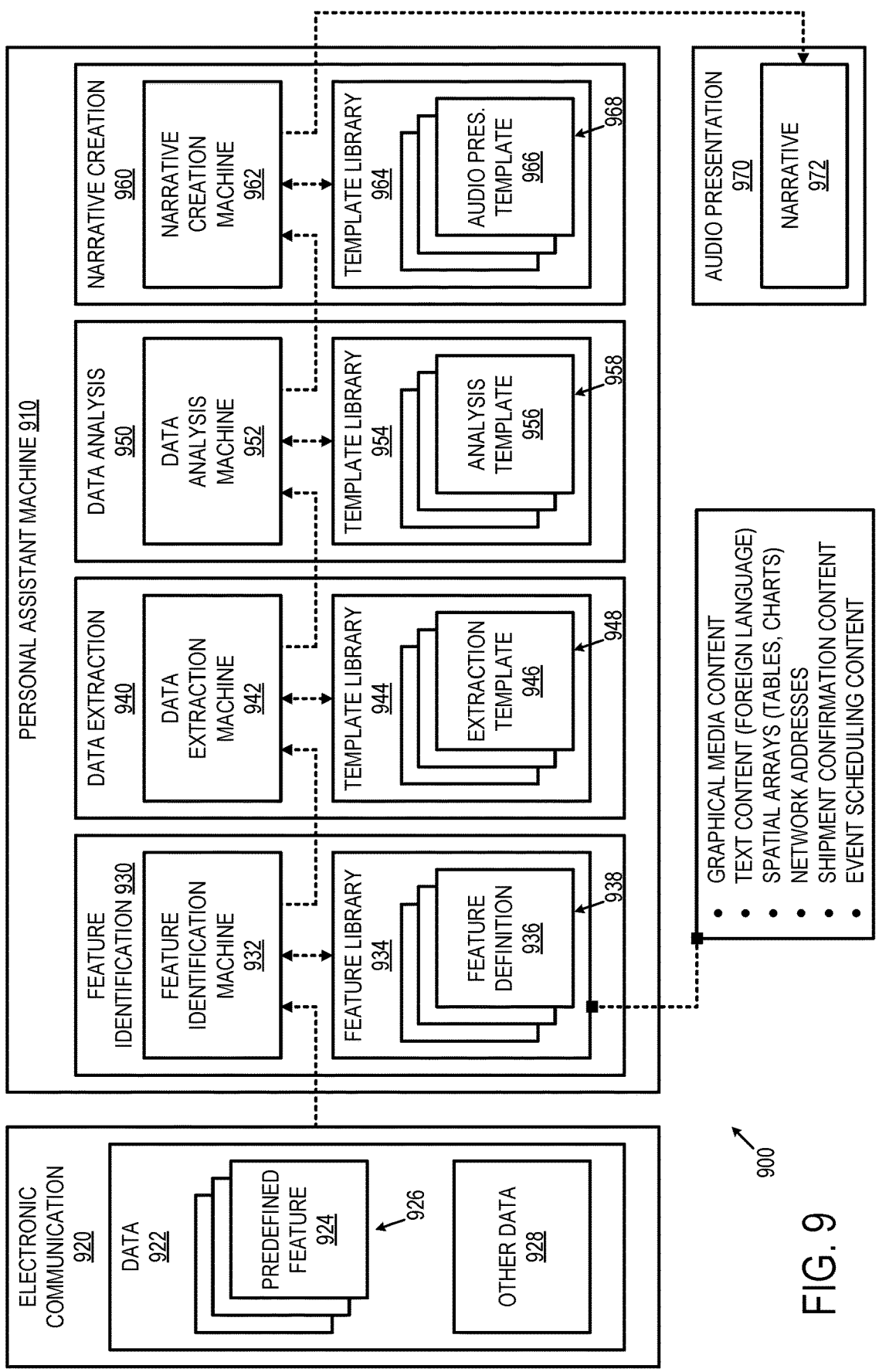
FIG. 9 depicts an example processing pipeline for outputting a narrative that describes an aspect of the contents of an electronic communication.

FIG. 9 depicts an example processing pipeline 900 for outputting a narrative describing an aspect of the contents of an electronic communication. This narrative may improve user comprehension and reduce the time needed to review the electronic communication. In the example of FIG. 9, processing pipeline 900 is implemented by a personal assistant machine 910, which is an example of previously described personal assistant machine 230 of FIG. 2. Personal assistant machine 910 may be located at a client computing device (e.g., computing device 210 of FIG. 2), at a server system (e.g., server system 260 of FIG. 2), or may be distributed between or among a client computing device and a server system.

Personal assistant machine 910 obtains an electronic communication 920 for a recipient, such as previously described with reference to operations 710 of FIG. 7A and 812 of FIG. 8. Personal assistant machine 910 may include or otherwise interface with one or more of feature identification machine 932, data extraction machine 942, data analysis machine 952, and narrative creation machine 962 to process and generate a suitable narrative for electronic communication 920. As previously described with reference to FIG. 2, the term "machine" may be used herein to collectively refer to a combination of instructions 222 (e.g., firmware and/or software) with hardware and/or other suitable components that cooperate to provide the described functionality.

Electronic communication 300 of FIG. 3 is an example of electronic communication 920 that may be obtained by personal assistant machine 910. Accordingly, data 922 of electronic communication 920 may include any of the data previously described with reference to electronic communication 300, including data that includes or identifies a sender, one or more recipients, a timestamp indicating a timing of receipt or transmission of the electronic communication, a subject, a message (i.e., a message body), one or more attachments, calendar data, a communication type, and/or other suitable data.

Personal assistant machine 910 may perform feature identification 930 using feature identification machine 932 to identify presence of a predefined feature 924 within data 922 of electronic communication 920. The feature identification machine may be configured to identify features that can be summarized, simplified, omitted, and/or otherwise modified in an audible narrative so as to improve a user experience when listening to the audible narrative. In at least some examples, feature identification machine 932 may use one or more feature definitions 936 to search for and identify one or more instances of predefined feature 924 within electronic communication 920. As an illustrative example, feature definition 936 may define file formats of media content that are to be identified within a message portion of electronic communication 920. As described in more detail below, a feature identification machine 932 may use a plurality of different feature definitions 936 to identify a corresponding plurality of different types of features.

Each feature definition may describe one or more characteristics of a corresponding predefined feature, such as a location within a data structure of the electronic communication where the predefined feature may be found (e.g., message body, subject, sender, recipient(s), attachments, and/or other data), a type or data format of the predefined feature (e.g., an image, a video, a weblink, or a text object represented by a particular markup language or file extension), a data size of the predefined feature, a data signature or structure of the predefined feature, or other suitable features.

Feature definition 936 may form part of a feature library 934 that includes a plurality of feature definitions 938. Feature library 934 may be included as part of feature identification machine 932 or may be referenced by the feature identification machine from a data storage subsystem. Each of the plurality of feature definitions 938 may be associated with a corresponding predefined feature that is identifiable by feature identification machine 932. For example, one feature definition may be directed to identifying the presence of hyperlinks within the message body of the electronic communication, while another feature definition may be directed to identifying a particular type of sender of the electronic communication for which other data may be extracted from the message body. Feature identification 930 may be performed to identify multiple predefined features 926 within electronic communication 920. Examples of predefined features that may be identifiable by feature identification machine 932 include graphical media content, text content, a language (e.g., English, Spanish, or Japanese) of the text content, spatial arrays of text content (e.g., tables and charts), URLs and/or other network addresses of corresponding network resources, shipment confirmation content, event scheduling content, or other suitable features.

In at least some examples, each of a plurality of predefined features defined by feature library 934 may be used to find different types of features. However, feature definitions of feature library 934 optionally may be filtered to obtain a subset of feature definitions used to perform a feature search. Additionally or alternatively, feature identification machine 932 may implement a hierarchy among the feature definitions. For example, the feature identification machine may utilize one or more hierarchically-lower feature definitions only if a hierarchically-higher feature definition successfully identifies a corresponding predefined feature. In at least some examples, a separate processing pipeline thread may be created for each feature definition of feature library 934, thereby enabling multiple processing pipeline threads to coexist.

In some examples, feature identification machine 932 may include one or more artificial intelligence and/or machine learning classifiers configured to identify a particular type of feature based on previous machine-learning training. As a nonlimiting example, the feature identification machine may include an artificial neural network configured to identify a particular feature, such as foreign language text. In some examples, two or more separately trained classifiers may be configured to look for a corresponding two or more different types of features within data 922.

Personal assistant machine 910 may perform data extraction 940 using data extraction machine 942 for each predefined feature identified in electronic communication 920 to extract a corresponding data subset from the electronic communication for that predefined feature. The data subset extracted for predefined feature 924 may include the predetermined feature (or a portion thereof) and/or other data 928 of the electronic communication. For example, upon identifying a predefined feature that includes a predefined sender of a shipment confirmation, shipping information contained in other data 928 may be extracted by data extraction machine 942.

In at least some examples, the data subset may be identified within the entire collection of data that defines electronic communication 920 by using a data extraction template 946 selected by data extraction machine 942 or other component of personal assistant machine 910. Data extraction templates such as template 946 may be configured to prioritize data extracted from the electronic communication in a manner that reduces or minimizes an amount of time needed to audibly present the corresponding narrative as compared to the original electronic communication. Data extraction template 946 may identify a plurality of data items for the data subset to be extracted from data 922 of electronic communication 920 and may further include a definition for each data item that is similar to the previously described feature definition 936. For example, a definition in the extraction template for each data item to be extracted may describe one or more characteristics of a corresponding feature of that data item, such as a location within a data structure of the electronic communication where the data item may be found, a type or format of the data item, a size of the data item, a signature or structure of the data item, or other suitable features.

Data extraction template 946 may be one of a plurality of data extraction templates 948 of a data extraction template library 944. Data extraction template library 944 may be included as part of data extraction machine 940 or may be referenced by the data extraction machine from a data storage subsystem. Each of the plurality of data extraction templates 948 may be associated with a corresponding predefined feature that is identifiable by feature identification machine 932. In other words, a predefined feature 924 (e.g., a URL) identified using a particular feature definition 936 (e.g., URL definition) may be subsequently processed with the data extraction template 946 (e.g., URL extraction template) associated with that feature definition 936. Accordingly, data extraction 940 may be performed to identify a plurality of data subsets within electronic communication 920 that each correspond to one or more of the plurality of predefined features 926 identified within the electronic communication.

In some examples, data extraction machine 942 may include one or more artificial intelligence and/or machine learning models configured to extract, from an electronic communication, a data subset corresponding to an identified feature based on previous machine-learning training. As a nonlimiting example, the data extraction machine may include an artificial convolutional neural network configured to extract a particular data subset, such as a string of foreign language text.

Personal assistant machine 910 may perform data analysis 950 using data analysis machine 952 to obtain a processed form of the data subset extracted by data extraction 940. The processed form of the data subset may be used to select and/or populate a downstream audio presentation template as part of narrative creation 960. Data analysis 950 may include combining one or more data subsets obtained by data extraction 940 with third-party sources of data, such as user preferences, user profile information, or other suitable data. Myriad different forms of data analysis may be performed by data analysis machine 952. For example, data analysis may include determining a number of instances of a particular type of predefined feature within the electronic communication and assigning a score to the electronic communication based on the number of instances. As another example, data analysis 950 may include determining an incomprehensibility score for electronic communication 920 that is based on one or more data subsets extracted from the electronic communication.

In at least some examples, the data subset may be analyzed using a data analysis template 956 selected by data analysis machine 952 or other component of personal assistant machine 910 for the predefined feature 924 that was identified within electronic communication 920 by feature identification 930. For example, each of a plurality of data analysis templates may be associated with a corresponding predefined feature that is identifiable by feature identification machine 932. In other words, data extracted for a predefined feature 924 (e.g., a URL) identified using a particular feature definition 936 (e.g., URL definition) may be subsequently processed with the data analysis template 956 (e.g., a URL analysis template) associated with that feature definition 936. For example, a data analysis template for a URL may define an algorithm for identifying a primary domain within the URL to be included in the narrative. Data analysis template 956 may be further selected based on the data subset extracted from the electronic communication by data extraction 940 for predefined feature 930. For example, extracted data that includes images within a message body may be analyzed using a different data analysis template than other visual items, such as data tables. Data analysis template 956 may include one or more algorithms for processing one or more data subsets extracted by data extraction 940 to obtain a processed form of that data.

Data analysis template 956 may be one of a plurality of data analysis templates 958 of a data analysis template library 954. Data analysis template library 954 may be included as part of data analysis machine 952 or may be referenced by the data analysis machine from a data storage subsystem. Each of the plurality of data analysis templates 958 may be associated with a corresponding predefined feature that is identifiable by feature identification machine 932. Accordingly, data analysis 950 may be performed to obtain a processed form of one or more data subsets corresponding to one or more predefined features identified within electronic communication 920.

Personal assistant machine 910 may perform narrative creation 960 using narrative creation machine 962 to derive a narrative 972 that describes an aspect of one or more data subsets extracted from electronic communication 920 by data extraction 940 and/or processed forms of such data obtained by data analysis 950 for one or more predefined features of the electronic communication. In at least some examples, narrative 972 may be derived by narrative creation machine 962 using an audio presentation template 966 that is configured to translate an aspect of the data subset and/or processed forms thereof into narrative form. Each of a plurality of audio presentation templates may be associated with a corresponding predefined feature that is identifiable by feature identification machine 932. In other words, data extracted for a predefined feature 924 (e.g., a URL) identified using a particular feature definition 936 (e.g., URL definition) that has been processed with the data analysis template 956 (e.g., a URL analysis template) to obtain a processed form of the extracted data (e.g., the primary domain within the URL) may be incorporated into a narrative using the audio presentation template associated with the feature definition. For example, an audio presentation template for a URL, as an example of a predefined feature identified within an electronic communication, may define a component of the narrative as including: "The message includes a link to [insert the primary domain within the URL]". The audio presentation template, in cooperation with corresponding data extraction, is configured to prioritize salient aspects of a communication so that the salient aspects may be presented in a comprehensible and time-efficient manner. As such, in cooperation with corresponding data extraction, the audio presentation template may functionally redact some to most of the original message content to produce the narrative for audible presentation and/or present words and/or phrases not included in the original message content.

As an illustrative example, narrative 972 may include the natural language phrase—"An hour ago you received a message confirming that your shipment from ACME Corporation will be delivered to your home tomorrow, July 30th". In this example, predefined feature 924 identified by feature identification 930 may include a sender of electronic communication 920 that is one of a predefined list of shipment confirmation senders defined by feature definition 936. A data subset extracted by data extraction 940 for the predefined feature may include a name identifying the shipment confirmation sender ("ACME Corporation"), a delivery date ("July 30th"), and a delivery location (a mailing address associated with the recipient's home) located within a message portion of electronic communication 920. Processed forms of the data subset obtained by data analysis 950 of this data subset may incorporate data from third-party sources, such as user preferences, user profile information, or other suitable data to include a delivery location ("home") that is associated with the mailing address of the user within the data subset and a relative delivery date ("tomorrow") that is associated with a delivery date of the data subset ("July 30th") extracted from the electronic communication, user profile information, and calendar information. In other words, the processed data may use one or more additional signals (e.g., a user profile including the user's home address) to convert data (e.g., a physical address) into a more user-friendly narrative (e.g., saying "home" in the narrative instead of saying "11222 Dilling St, Studio City, Calif. 91602").

In at least some examples, audio presentation template 966 may include one or more predefined natural language statements and one or more data fields defined in relation to the natural language statements that collectively form narrative 972. Narrative creation machine 962 may incorporate, into the one or more data fields, one or more data subsets extracted from electronic communication 920 by data extraction 940 and/or processed forms of such data obtained by data analysis 950. Continuing with the above shipping confirmation example, audio presentation template 966 may include the predefined natural language statement "you received a message confirming that your shipment from" followed by the data field represented in the above example by a name ("ACME Corporation") identifying the shipment confirmation sender extracted by data extraction 940.

Audio presentation template 966 may be one of a plurality of audio presentation templates 968 of a data presentation template library 964. Data presentation template library 964 may be included as part of narrative creation machine 960 or may be referenced by the narrative creation machine from a data storage subsystem. Each of the plurality of audio presentation templates 968 may be associated with a corresponding predefined feature that is identifiable by feature identification machine 932. Audio presentation template 966 may be selected by narrative creation machine 962 or other component of personal assistant machine 910 for the predefined feature 924 that was identified within the electronic communication by feature identification 930.

In at least some examples, audio presentation template 966 may be further selected from two or more audio presentation templates associated with predefined feature 924 for the data subset that was extracted by data extraction 940 and/or the processed forms of such data that was obtained by data analysis 950. Each audio presentation template may include one or more conditions against which the data subset extracted by data extraction 940 and/or the processed forms of such data obtained by data analysis 950 may be judged for selection of that audio presentation template.

As an example, data analysis 950 may include determining an incomprehensibility score for an electronic communication, and an audio presentation template may be selected from two or more audio presentation templates based on the value of the incomprehensibility score being below or above a threshold value. In this example, a first audio presentation template may define a first narrative that includes a qualitative description of the incomprehensibility score, such as "this message will be difficult to understand", while a second audio presentation template may instead define a second narrative that audibly describes an aspect of the content without providing the qualitative description, such as "Tom wishes you 'happy birthday' and includes an image".

Personal assistant machine 910 outputs narrative 972 in an electronic format for inclusion in an audio presentation 970. Audio presentation 970 is an example of the audio presentation previously described with reference to FIG. 4. In an example, narrative 972 may form part of a communication summary (e.g., communication summary 422 of FIG. 4) that precedes presentation of message content (e.g., message content 424 of FIG. 4) of the electronic communication. In another example, narrative 972 may provide a summary that replaces some or all of the message content (e.g., message content 424 of FIG. 4) of the electronic communication within the audio presentation, such as where some or all of the message content is not audibly output in the audio presentation. In another example, narrative 972 may form part of a thread summary (e.g., thread summary 420 of FIG. 4) that precedes presentation of one or more electronic communications of a conversation thread (e.g., conversation thread 470 of FIG. 4). In another example, narrative 972 may form part of a presentation road map (e.g., presentation road map 414 of FIG. 4) that precedes presentation of one or more conversation threads that each include one or more electronic communications.

Figure 10:
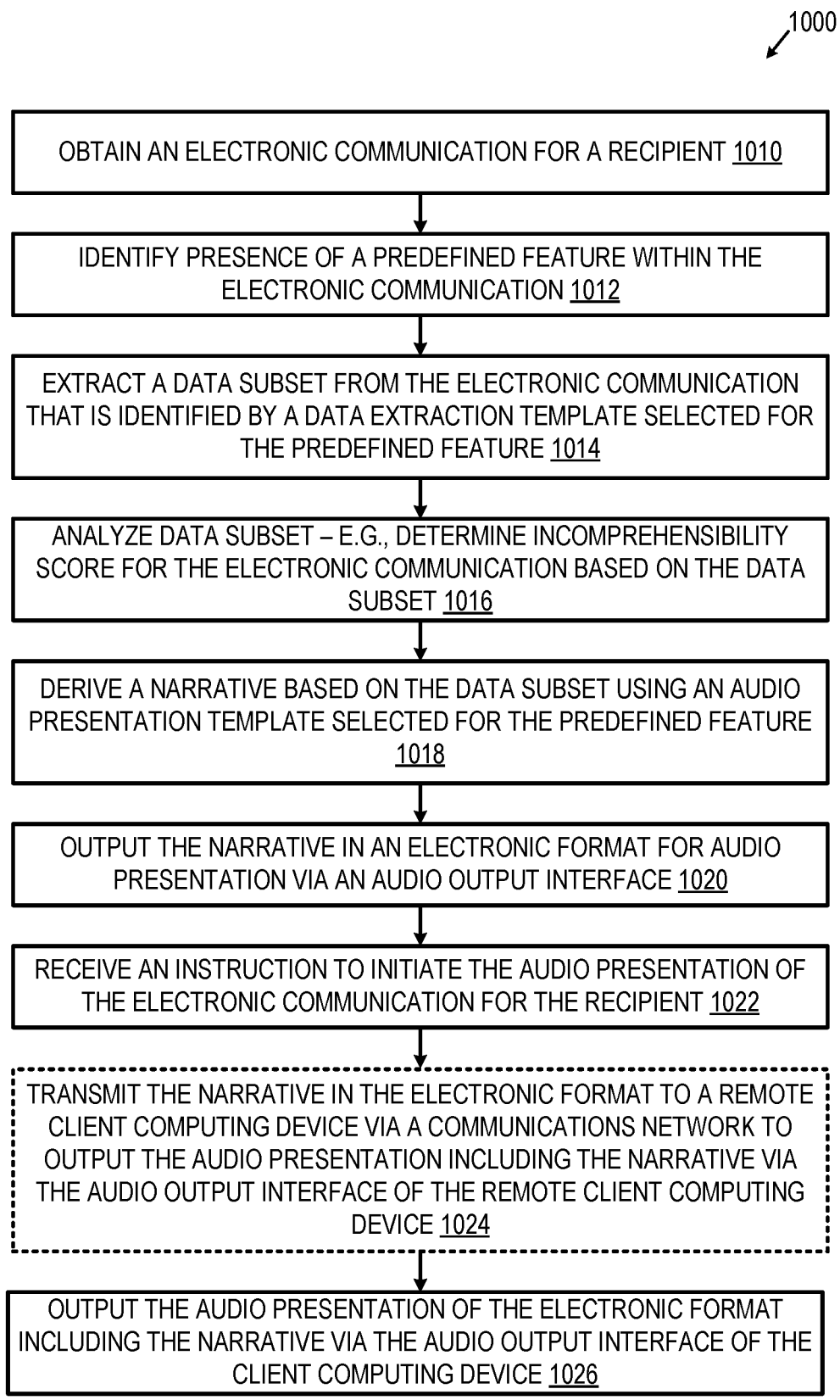
FIG. 10 depicts a flow diagram of an example method for outputting a narrative that describes an aspect of the contents of an electronic communication.

FIG. 10 depicts a flow diagram of an example method 1000 for outputting a narrative that describes an aspect of the contents of an electronic communication. Method 1000 or portions thereof may be performed by one or more computing devices of a computing system. For example, method 1000 may be performed by computing device 210 of FIG. 2, or by a computing system that includes computing device 210 in combination with server system 260 of FIG. 2. For example, method 1000 or portions thereof may be performed by personal assistant machine 910 of FIG. 9.

At 1010, the method includes obtaining an electronic communication for a recipient, such as previously described with reference to operations 710 of FIG. 7A and 812 of FIG. 8. Electronic communication 300 of FIG. 3 is an example of an electronic communication that may be obtained at 1010.

At 1012, the method includes identifying presence of a predefined feature (e.g., 924 of FIG. 9) within the electronic communication as previously described, as one nonlimiting example, with reference to feature identification machine 932. In at least some examples, the predefined feature is one of a plurality of predefined features identifiable by the computing system in which each predefined feature is associated with a corresponding data extraction template (e.g., 946 of FIG. 9) and a corresponding audio presentation template (e.g., 966 of FIG. 9). Operation 1012 may be performed to identify multiple instances of a predefined feature within the electronic communication. The predefined feature identified at 1012 may be one of a plurality of different predefined features identified within the electronic communication.

As an illustrative example, the predefined feature may include graphical media content within the electronic communication. The graphical media content may include one or more graphical media content items, such as images and/or videos. Graphical media content may further include spatial arrays of text content, such as tables or charts. Graphical media content items may be included in a message portion of the electronic communication, such as in-line with text content of a message body. Additionally or alternatively, the graphical media content items may be included as attachments to the electronic communications.

At 1014, the method includes extracting a data subset from the electronic communication that is identified by a data extraction template selected for the predefined feature identified within the electronic communication. In at least some examples, the data extraction template is selected for the predefined feature from a plurality of data extraction templates, such as previously described with reference to data extraction template library 944.

At 1016, the method includes analyzing the data subset extracted at 1014. In at least some examples, analyzing the data subset at 1016 may include determining an incomprehensibility score for the electronic communication.

Continuing with the above example where the predefined feature includes graphical media content within the electronic communication, the incomprehensibility score may be determined based, at least in part, on a relative amount of graphical media content as compared to text content identified within the electronic communication. For example, the incomprehensibility score may be based on a quantity of one or more graphical content items (e.g., images or videos) and a quantity of one or more text objects (e.g., words) identified as being present within a message portion of the electronic communication by identifying presence of each graphical media content item and each text object within the message portion of the electronic communication. In at least some examples, the quantity of text objects has a relationship to the incomprehensibility score that is an inverse of the quantity of the graphical media content items. For example, as the quantity of graphical media content items increases in relation to the quantity of text objects, the incomprehensibility score may increase to indicate that audio presentation of the electronic communication will be less comprehensible to users. Conversely, as the quantity of graphical media content items decreases in relation to the quantity of text objects, the incomprehensibility score may decrease to indicate that audio presentation of the electronic communication will be more comprehensible to users.

At 1018, the method includes deriving a narrative based on the data subset and/or processed forms of such data using an audio presentation template selected for the predefined feature identified within the electronic communication. As previously described with reference to FIG. 9, the audio presentation template is configured to translate an aspect of the data subset into narrative form. The audio presentation template may be selected for the predefined feature from a plurality of audio presentation templates, such as previously described with reference to audio presentation template library 964 of FIG. 9.

In at least some examples, the aspect described by the narrative may include a notice that at least a portion of the electronic communication cannot be audibly presented or is unlikely to be comprehended by the user if output in audible form. For example, visual media content, network addresses for network resources, text content in a language other than the recipient's preferred language, etc. may not be capable of being audibly output as part of an audio presentation of the electronic communication or may be unlikely to be audibly comprehended by the user. The narrative may alternatively or additionally identify the portion of the electronic communication that is not included in the audio presentation by a class identifier (e.g., image, video, network address, or foreign language text) and/or a title of that portion (e.g., image title, video title, or primary domain of the network address).

In a first example where the predefined feature identified at 1012 includes graphical media content within the electronic communication, the aspect described by the narrative may identify a media type of the graphical media content, such as an image, video, or spatial array of text content such as a table or chart. An example narrative that describes the presence of graphical content in a message body of an electronic communication includes: "A few hours ago, Tom sent an email about 'Status report' that includes some visual content in the message, so I'll read what I can. It says, 'Hi team, I need to get this broadly distributed. Look for your name and assignment here.' Then there's a table, then it goes on, 'Please let me know if you have any additional questions.' That's the entire message." By providing a notice of the presence of the table in the above example rather than audibly outputting the text content of the table, the time needed to audibly review the electronic communication may be reduced and/or the message content may be more clearly understood by the user. Continuing with the above example, salient information that is relevant to the user (as the recipient of the electronic communication) may be extracted from the data table, and a portion of that information may be included in the narrative that is audibly presented to the user. For example, a data table may include text in the form of a list of work shifts for multiple people, and data analysis performed at 1016 may include identifying the name of the user within a cell of the data table and extracting a row and/or column of data from the data table that contains that cell. The data extracted from the row and/or column may be incorporated into a narrative that is then audibly output to the user, such as "The table included in the message includes your name followed by 'Saturday' within a day field of the table, and '3 pm to 6 pm' within a time field of the table".

Alternatively or additionally, the aspect described by the narrative may identify an estimated audio comprehensibility for graphical content that is based on the incomprehensibility score determined at 1016. For example, the estimated audio comprehensibility may include a quantitative and/or a qualitative description of the incomprehensibility score determined at 1016. An example of a qualitative description of the incomprehensibility score may include a notice, such as a warning or a suggestion that the message portion of the electronic communication contains visual content or that the message portion should be reviewed visually via a graphical display device rather than being audibly output as part of the audio presentation. For example, a narrative may include: "About an hour ago, John emailed about 'puppy extravaganza' to you and Erik. There's a lot of visual content, so you'll want to view this on a screen."

In a second example where the predefined feature identified at 1012 includes text content, the aspect described by the narrative may identify text content that is not in a preferred language of the recipient. For example, the predefined feature may include text content having a different language (e.g., Japanese) than the preferred language (e.g., English) of the recipient, and the aspect described by the narrative may identify presence of the text content having the different language and/or may indicate the different language. Spelling errors within text content that are indecipherable by the computing system may be characterized as a different language from the preferred language of the recipient.

The incomprehensibility score may be used to determine whether a message portion that contains indecipherable text content and/or text content in languages other than the user's preferred language should be included in an audio presentation of the electronic communication and/or whether a notice of the text content should be included in the narrative. This narrative approach accounts for the problem that some forms of text-to-voice conversion may audibly mispronounce text content that is indecipherable to the system or text content of a language that differs from a language which the system was trained to convert from text into voice. Furthermore, this narrative approach accounts for the problem that users that are less fluent in a particular language may have a lower comprehension rate in spoken form than in text form, or may have a slower comprehension rate than a rate that the system audibly outputs the text content. Based on the narrative, a user may make an informed decision whether message content should be audibly reviewed or instead set aside for visual review.

In an example, a narrative may include: "You received a message from Tim, but it includes a lot of Japanese text, so I'll flag this message so you can review it later." In this example, the relative proportion of Japanese text to the user's preferred language text may be judged to be sufficiently high to avoid audibly outputting the text content of the message. In another example, a narrative may include: "You received a message that includes only a few words in Japanese, so I'll attempt to read the message. Please interrupt if you want me to skip this message". In this example, the relative proportion of Japanese text to the user's preferred language text may be less than the preceding example, and the narrative may inform the user of the presence of content that may make an audible presentation of such content incomprehensible.

By reducing an amount of text content that is audibly output to the user by removal of foreign language or indecipherable content from the audio presentation, an amount of time needed to audibly review the electronic communication may be reduced. However, in other examples, where translation to the recipient's preferred language is supported, the narrative may indicate that the translated portion of the text that is audibly output in the audio presentation has been translated from the foreign language, and may further identify the foreign language. For example, a narrative may include "You received a message from Tim that includes a portion of text that was automatically translated for you from Japanese, it says . . . ."

In a third example where the predefined feature identified at 1012 includes a network address (e.g., weblink or file path) of a network resource, the aspect described by the narrative may identify a primary domain of the network address while excluding one or more subdomains and/or a preamble portion of the network address from the narrative or from the audio presentation. For example, given the network address "https://products.office.com/en-us/outlook/email-and-calendar-software-microsoft-outlook", the narrative may include "office.com" or "products.office.com" while excluding one or more subdomains "en-us/outlook/email-and-calendar-software-microsoft-outlook" and/or the preamble portion "https://". Examples of narratives for file paths related to shared documents include: "Amy shared 'latest mocks for Sam' with you on OneDrive", where OneDrive (TM) represents the primary domain of the sharing service; and "OneDrive sent you a reminder, Amy shared 'latest mocks for Sam' with you". By reducing a length of the network address audibly output to the user, the network address included in the message content may be more clearly understood by the user and/or an amount of time needed to audibly review the electronic communication may be reduced. Additionally or alternatively, the incomprehensibility score may be used to determine whether a message portion that contains one or more network addresses should be included in an audio presentation of the electronic communication and/or whether a notice of the network addresses should be included in the narrative.

In a fourth example where the predefined feature includes a sender of the electronic communication that is one of a predefined list of shipment confirmation senders, the aspect described by the narrative may identify the shipment confirmation sender, and one or more of a delivery date, delivery status, delivery location, contents of a shipment, and/or other suitable shipment-related information. As previously described with reference to FIG. 9, an example of a narrative for a shipment confirmation sender may include—"An hour ago you received a message confirming that your shipment from ACME Corporation will be delivered to your home tomorrow, July 30th". Other examples of narratives include: "Looks like your package from ACME Corporation was cancelled."; and "You've got a package from ACME Corporation on the way.". By extracting shipping confirmation content from the electronic communication, shipping confirmation information may be more clearly conveyed to the user by audio presentation and/or an amount of time needed to audibly review the electronic communication may be reduced.

In a fifth example where the predefined feature includes event scheduling content, the aspect described by the narrative may identify an organizer of an event indicated by the event scheduling content, and may further identify one or more of an event date, an event name, an event location, and/or other suitable event-related information. Event scheduling content may include calendar data of the electronic communication and/or text content data in a message portion of the electronic communication, as examples. Event scheduling content may be identified by a sender of the electronic communication in at least some examples. Event scheduling content may include transportation-related events, such as airline flight reservations, train or bus reservation, etc. Examples of narratives describing event scheduling content of an electronic communication in simplified form include: "Conference Room 10005 is reserved for "Team sync" at 10 AM tomorrow."; "Tom declined your invitation to 'customer review' at 9:30 AM on Friday."; "Sam invited you to 'Let's get lunch!' at 12:30 PM tomorrow, and commented, 'Can't wait to see you!'."; "Paul extended 'Brainstorming session', which is happening tomorrow at 2 PM, to two hours, and added 'Conference Room 125' as the location."; and "Your flight to Boston tomorrow is delayed one hour, and will be leaving at 1 pm instead of 12 pm". By extracting the event scheduling content from the electronic communication, event scheduling information may be more clearly conveyed to the user by audio presentation and/or an amount of time needed to audibly review the electronic communication may be reduced.

At 1020, the method includes outputting the narrative in an electronic format for audio presentation via an audio output interface in which the narrative describes the aspect of the data subset or processed form thereof that was extracted from the electronic communication. In at least some examples, the electronic format including the narrative may be stored in a data storage subsystem from which the narrative may be later accessed and converted into audible natural language speech at the time of the audio presentation, such as by speech output machine 232 of FIG. 2.

At 1022, the method includes receiving an instruction to initiate the audio presentation of the electronic communication for the recipient via a client computing device of the computing system, such as previously described with reference to operations 728 of FIG. 7A, 752 of FIG. 7B, and 810 of FIG. 8.

At 1024, the method includes transmitting the narrative in the electronic format to a remote client computing device via a communications network to output the audio presentation including the narrative via an audio output interface of the remote client computing device. Transmitting the narrative in an electronic format at 1024 may be performed by a server system or other computing device responsive to the instruction received at 1022. However, in other examples, operation 1024 may be omitted, such as where operation 1020 is performed locally at the client computing device.

At 1026, the method includes outputting the audio presentation including the narrative via the audio output interface of the client computing device. Outputting the audio presentation at 1026 may be performed responsive to the instruction received at 1022. In at least some examples, the narrative may be presented as part of the communication summary of the electronic communication, such as example communication summary 422 of FIG. 4. For example, the narrative may precede the message content (e.g., 424 of FIG. 4) in the audio presentation. In other examples, the narrative may replace some or all of the message content of the electronic communication, such as message content 424 of FIG. 4. For example, a narrative including a notice of a graphical content item located in-line with text content may be provided by audibly presenting a first portion of the text content that precedes the graphical content item, followed by the notice portion of the narrative, followed by additional text content that is located after the graphical content item in the message portion. In still further examples, the narrative may be included in a thread summary (e.g., 420 of FIG. 4) or presentation roadmap (e.g., 414 of FIG. 4).

An audio presentation of text-based electronic communications relies on text-to-speech (TTS) conversion of text content to obtain audio content containing machine generated speech. The ability to output this audio content at a user's computing device can be enhanced in at least some implementations by performing TTS conversion remotely at a server system, and by streaming audio content containing machine generated speech to the user's computing device over a separate, dedicated network connection. This approach offers several potential benefits, including: (1) keeping an existing network connection (e.g., Websocket) free for voice interaction between the user and server-based program components, (2) enabling the user's computing device to cache the audio content to improve user navigation with respect to the audio presentation, (3) providing the ability for the user to consume the audio presentation while offline, (4) improving performance and reliability of delivering the audio presentation to the user, and (5) the ability to audibly present electronic communications containing a greater amount of text content.

Figure 11:
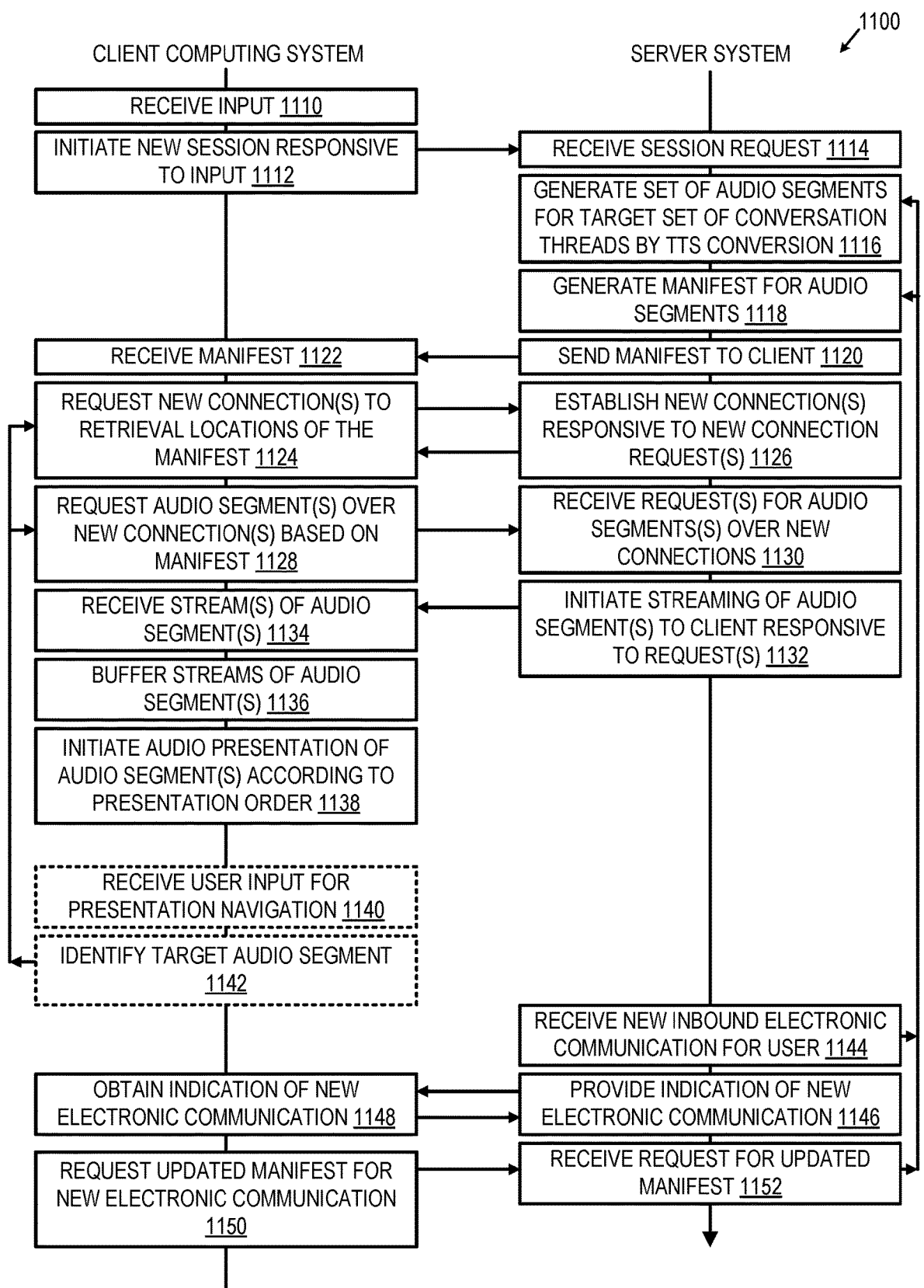
FIG. 11 depicts a flow diagram of an example method for delivering audio content to a client computing system for presentation to a user.

FIG. 11 depicts a flow diagram of an example method 1100 for delivering audio content to a client computing system (e.g., computing device 210 of FIG. 2) as part of an audio presentation of electronic communications for a user. Within FIG. 11, a server system of one or more server computing devices implements server-side components of a personal assistant machine (e.g., personal assistant machine 230 of FIG. 2).

At 1110, an input is received at the client computing system that causes the client computing system to initiate a new session at 1112. As a first example, the input includes an instruction from a user to initiate audio presentation of electronic communications for the user as a recipient. Operation 1110 is an example of previously described operation 728 of FIG. 7A. For example, the instruction may take the form of a spoken command by a user, such as "Read messages". As another example, the input received at 1110 includes the client computing system connecting to an audio system (e.g., of a vehicle) over a personal area network connection, such as via the Bluetooth protocol. To initiate the new session, the client computing system sends a presentation request or session request to the server system at 1112. This request can include a user identifier associated with a user of the client computing system. As an example, the method at 1112 includes the client computing system sending to the server system a presentation request for an audio presentation of electronic communications.

At 1114, the server system receives the presentation request or session request from the client computing system. For each of a plurality of electronic communications, the server system performs text-to-speech conversion of the electronic communication to obtain a text-to-speech audio segment for that electronic communication, and stores the text-to-speech audio segment at a segment-specific retrieval location of the server system as one of a plurality of text-to-speech audio segments of the plurality of electronic communications. For example, within FIG. 11, at 1116, the server system generates a set of audio segments by performing text-to-speech conversion of a target set of electronic communications for the user. As an example, the target set of electronic communications are identified by the server system as including conversation threads of unreviewed electronic communications addressed to the user of the client computing system.

The audio segments generated at 1116 can include some or all of the audio segments that form timeline 400 of FIG. 4, as an example. Referring also to FIG. 4, the audio segments generated at 1116 can include greeting 410, presentation road map 414, barge-in notice 416, changes to the day 418, thread summary 420, communication summary 422, message content 424, guided notice 430, additional information 460, sign-off 462, and/or additional instances of thread summaries, communication summaries, message content, etc. In an example, a separate audio segment can be generated for each item (e.g., each electronic communication) of timeline 400 of FIG. 4 that collectively forms the audio presentation. In another example, an audio segment can be generated that combines two or more of items that are presented in a sequential order within timeline 400 of FIG. 4. For example, a respective audio segment can be generated for each conversation thread (e.g., 470, 472 of FIG. 4) that includes a thread summary (e.g., 420), a communication summary (e.g., 422, 426), and message content (e.g., 424, 428) for each unreviewed electronic communication that is addressed to the user of the client computing system as a recipient. Thus, for the example timeline 400 of FIG. 4, at least two audio segments can be generated corresponding to conversation threads 470 and 472.

At 1118, a manifest is generated for the various audio segments generated at 1116. As described in further detail with reference to example manifest 1280 of FIG. 12, the manifest identifies respective retrieval locations of the audio segments including one or more network addresses of network resources, byte ranges of those network resources, and/or segment identifiers that are used by the client computing system to initiate new connections with the server system and/or to request particular audio segments from the server system. As part of generating the manifest at 1118, the server system may identify, for each of the plurality of audio segments, a presentation order of the audio segment within the audio presentation. The server system may generate a data structure for the manifest that indicates the presentation order, such as described in further detail with reference to FIGS. 13A-13E. However, in other examples, the manifest may not indicate a presentation order of audio segments.

At 1120, the server system sends the manifest to the client computing system, which is received by the client computing system at 1122. As an example, the client computing system receives from the server system a manifest indicating a plurality of segment-specific retrieval locations in which a different one of the plurality of segment-specific retrieval locations is indicated for each of a plurality of text-to-speech audio segments of the audio presentation. The manifest can be sent by the server system as part of initiating a new session with the client computing system. In at least some examples, the manifest or an updated version of the manifest is sent by the server system at 1120 responsive to receiving a presentation request from the client computing system at any stage of a current session with the server system. In at least some examples, the client computing system can identify a presentation order of the text-to-speech audio segments within an audio presentation based on a structure of a plurality of segment-specific retrieval locations indicated by the manifest. Example data structures of a manifest are described in further detail with reference to FIGS. 13A-13E.

For each of the plurality of text-to-speech audio segments, the client computing system: identifies a presentation order of the text-to-speech audio segment within the audio presentation; sends to the server system a segment request for the text-to-speech audio segment at the segment-specific retrieval location for that text-to-speech audio segment; receives from the server system the text-to-speech audio segment responsive to the segment request for that text-to-speech audio segment; and outputs the text-to-speech audio segment in the identified presentation order. In an example, each of the segment-specific retrieval locations is associated with a segment identifier within the manifest, and the segment identifier identifies a respective electronic communication of the audio presentation, such as depicted in FIG. 13B.

In at least some examples, the client computing system establishes a new network connection with the server system that differs from a network connection over which the manifest is received. In this way, audio segments may be received over the new connection while the previously-established connection remains available for control and/or notification communications without being burdened by audio segment delivery. As examples, the previously-established connection may be used by the client computing system to request and receive notifications of inbound communications and updated manifests, and to report client operating conditions or states. Establishing a new connection may improve performance (e.g., speed and/or bandwidth) of communications between the client computing system and the server system. At 1124, for example, the client computing system uses the manifest to request one or more new connections to the server system at one or more network addresses identified by the manifest. In at least some examples, the new connection can be to a different server of the server system than a server from which the manifest was received. At 1126, the server system establishes one or more new connections with the client computing system responsive to the one or more requests for the new connections being received by the server system.

The client computing system can send segment requests for text-to-speech audio segments of one or more of a plurality of text-to-speech audio segments over the new network connection established with the server system. For example, at 1128, the client computing system requests one or more audio segments over the new connections established with the server system. However, a new network connection need not be established in at least some examples, as the same network connection over which the manifest was received may be used to request and receive audio segments. The requests from the client computing system can include segment identifiers of the manifest that identify specific audio segments to be streamed to the client computing system.

In a first example, the manifest includes a list of multiple retrieval location identifiers that each correspond to a location on the server system from which a particular audio segment can be streamed to the client computing system. As an example, the manifest includes a retrieval location identifier in the form of a network address of a network resource and/or byte ranges of the network resource on the server system from which audio segments can be streamed to the client computing system, and the client computing system can request a particular audio segment by including a segment identifier and/or byte range obtained from the manifest in the request sent to the server system at 1128.

In at least some examples, the client computing system requests audio segments in an order that corresponds to the presentation order of those segments within the audio presentation. However, other suitable techniques may be used by the client computing system to request audio segments, including streaming multiple audio segments in parallel, preloading an initial portion of the audio segments, or prioritizing the streaming order based on the length or size of audio segments.

At 1130, the server system receives one or more requests for audio segments over the new connections established with the client computing system, and initiates streaming of those audio segments to the client computing system responsive to the requests.

At 1134, the client computing system receives the one or more audio segments, and stores or buffers those streams in a data storage device of the client computing system at 1136. As an example, the client computing system stores, within a non-volatile storage device of the client computing system, each of the plurality of text-to-speech audio segments received from the server system. For each of the plurality of text-to-speech audio segments, the client computing system associates a storage location identifier indicating a storage location of the text-to-speech audio segment with a segment identifier. The client computing system can output the text-to-speech audio segment in the identified presentation order by retrieving the text-to-speech audio segment from the storage location within the non-volatile storage device indicated by the storage location identifier associated with the segment identifier of the text-to-speech audio segment. This approach can be used to provide output an audio presentation while the client computing system does not have network connectivity (e.g., is offline). In examples where the client computing system streams the audio segments, the client computing system stores, within a streaming buffer within a storage device of the client computing system, each of the plurality of text-to-speech audio segments received from the server system. The client computing system can output the text-to-speech audio segment in the identified presentation order includes outputting the text-to-speech audio segment from the streaming buffer.

At 1138, the client computing system initiates presentation of the one or more audio segments according to a presentation order (e.g., timeline 400 of FIG. 4) to output an audio presentation of the user's electronic communications.

Optionally at 1140, the client computing system receives a user input for navigation within the audio presentation. As an example, a user may provide a spoken command to advance the audio presentation from an electronic communication or conversation thread to another electronic communication or conversation thread. At 1142, a target audio segment for the navigation is identified by the client computing system. The process flow of method 1100 can return to operations 1124 and/or 1128 where new connections and/or audio segments are requested by the client computing system using the manifest to obtain an audio segment requested by the user input received at 1140.

At 1144, the server system receives one or more new electronic communications addressed to the user as the recipient. At 1146, the server system provides an indication of the new electronic communications to the client computing system, and the client computing system receives the indication of the new electronic communications at 1148.

At 1150, the client computing system requests an updated manifest for the new electronic communications, which is received by the server system at 1152. For example, responsive to receiving an indication of a new inbound electronic communication, the client computing system sends to the server system a new presentation request for a new audio presentation of the one or more new inbound electronic communications. Alternatively, the server system can provide the updated manifest to the client computing system as part of providing the indication of the new electronic communications at 1146 without receiving a request from the client. From operations 1144 and/or 1152, the process flow can return to operations 1116 and/or 1118 where a new set of one or more audio segments is generated for the new electronic communications, and the updated manifest is generated for the new set of audio segments. The updated manifest is then sent to the client computing system at operation 1120. For example, the client computing system receives from the server system a new manifest indicating one or more segment-specific retrieval locations for the one or more new inbound electronic communications.

Figure 12:
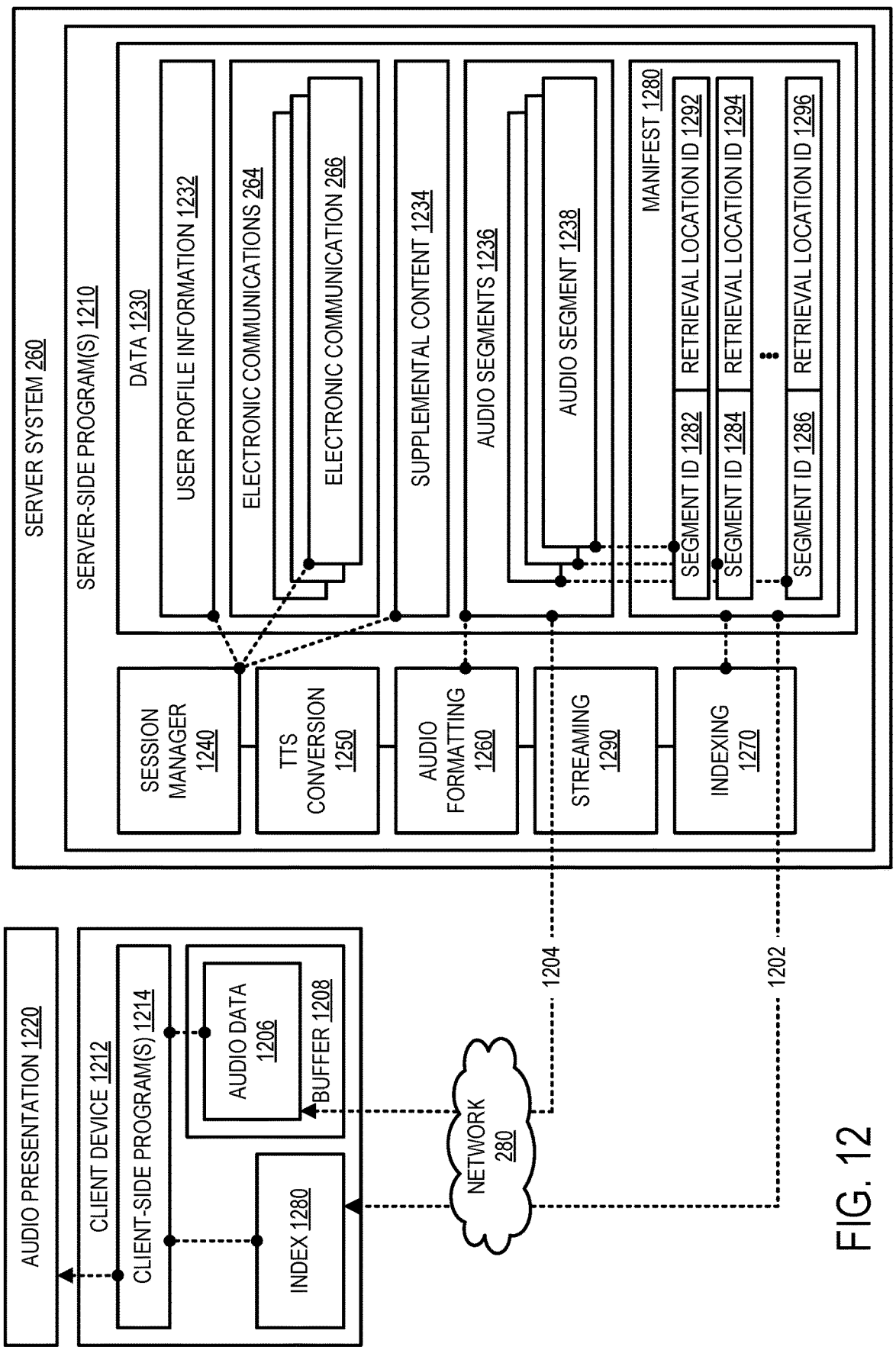
FIG. 12 schematically depicts an example computing system configured to perform the method of FIG. 11.

FIG. 12 schematically depicts an example computing system 1200 configured to perform method 1100 of FIG. 11, consistent with computing system 200 of FIG. 2. Within FIG. 12, server system 260 of FIG. 2 hosts a set of server-side programs 1210. Server-side programs 1210 may include server-side program components of personal assistant machine 230 of FIG. 2 and/or communications service 262. FIG. 12 also depicts an example client device 1212 having a set of client-side programs 1214 that may include client-side program components of personal assistant machine 230 of FIG. 2 and/or communications applications 238. Client-side programs 1214 interact with server-side programs 1210 via network 280 to output an audio presentation 1220 of a set of electronic communications 264. Client device 1212 is an example of previously described computing device 210 of FIG. 2.

In FIG. 12, data 1230 of server-side programs 1210 includes previously described electronic communications 264 of FIG. 2 of which electronic communication 266 is an example. Server-side programs 1210 further include a session manager 1240 that facilitates session management between client-side programs 1214 of client device 1212 and server-side programs 1210. As an example, session manager 1240 receives session requests from client device 1212 consistent with operation 1114 of FIG. 11, and initiates the various session related activities performed by the server system in FIG. 11. For example, responsive to receiving an instruction to initiate audio presentation of electronic communications for a recipient, session manager 1240 can reference client profile information 1232 of data 1230, identify one or more target electronic communications (e.g., unreviewed communications) as a subset of electronic communications 264, and identify or generate supplemental content 1234 that is to form part of audio presentation 1220. Supplemental content 1234 can include summarization or narrative forms of the electronic communications as well as a greeting, presentation road map, barge-in notice, changes to the day, thread summaries, communication summaries, etc. as described with respect to the example audio presentation of FIG. 4.

TTS conversion 1250 is then performed by server-side programs 1210 for text content of the electronic communications identified by session manager 1240 for inclusion in audio presentation 1220 to generate audio content containing machine generated human speech. Audio formatting 1260 can be performed to combine the audio content containing the machine generated human speech with supplemental audio content 1234 to obtain a set of audio segments of which audio segment 1238 is an example. Indexing 1270 of the set of audio segments 1236 is performed to generate an manifest 1280 consistent with operation 1118 of FIG. 11.

Manifest 1280 is depicted in FIG. 12 for a plurality of audio segments 1236 as including a segment identifier and/or a retrieval location identifier associated with audio segments 1236 to be included in audio presentation 1220. Segment identifiers and/or retrieval location identifiers can be assigned by server-side programs 1210 as part of the indexing process indicated at 1270. The assignment of retrieval location identifiers can reflect server availability, for example. In at least some examples, one or more of audio segments 1236 can include TTS content that was previously converted for another user associated with the electronic communication (e.g., the sender or another recipient in a multi-user electronic communication). In this example, assignment of retrieval location identifiers and/or segment identifiers as part of the indexing 1270 can use previously assigned retrieval location identifiers and/or segment identifiers.

In a first example of indexing 1270, manifest 1280 includes at least one retrieval location which can include a network address of a network resource and/or a byte range hosted by server system 260 from which respective audio segments 1236 can be obtained by client device 1212. In this example, each audio segment of audio segments 1236 can be associated with a respective segment identifier. For example, segment identifier 1282 is associated with audio segment 1238, segment identifier 1284 is associated with another of audio segments 1236, and segment identifier 1286 is associated with yet another of audio segments 1236. Segment identifiers can be included in requests for audio segments sent by client device 1212 to server system 260, and the server system can send the audio segments associated with the requested segment identifiers to client device 1212.

Additionally or alternatively, audio segments can be identified based on their respective position or order of retrieval location identifier within an ordered sequence, list, or predefined configuration of manifest 1280. For example, a first byte range or network address (e.g., 1292) in an ordered list of manifest 1280 can denote audio segment 1238 of a first conversation thread (e.g., 470 of FIG. 4), while a second byte range or network address (e.g., 1294) in the ordered list can denote another of audio segments 1236 of second conversation thread (e.g., 472 of FIG. 4), and a third byte range or network address (e.g., 1296) in the ordered list can denote yet another of audio segments 1296 of a third conversation thread or subsequent portion of audio presentation 1220. Thus, the relationship between or among byte ranges or network addresses within manifest 1280 can enable client-side programs 1214 to retrieve the appropriate audio segment from a particular byte range using a network address. In these examples, the byte range or network address can itself serve as the segment identifier.

As depicted at 1202, manifest 1280 is sent by server system 260 to client device 1212 via network 280, consistent with operation 1120 of FIG. 11. Client-side programs 1214 use manifest 1280 to request one or more new connections with the server system and to request one or more of audio segments 1236 based on the retrieval location identifiers and/or segment identifiers of the manifest, consistent with operations 1124 and 1128 of FIG. 11.

Server-side programs 1210 perform streaming 1290 of audio segments to client device 1212 via communications network 280 as indicated by example stream 1204. In FIG. 12, client device 1212 receives the streamed audio segments requested by the client device as indicated by audio data 1206 stored within buffer 1208. Audio segments or portions thereof represented by audio data 1206 can be output by client-side programs 1214 as part of audio presentation 1220.

FIGS. 13A-13E depict examples of data that may be included in or otherwise indicated by a manifest, such as manifest 1280 of FIG. 12.

Figure 13A:
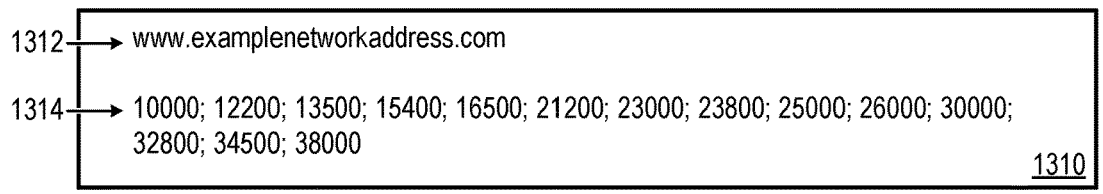
Figure 13B:
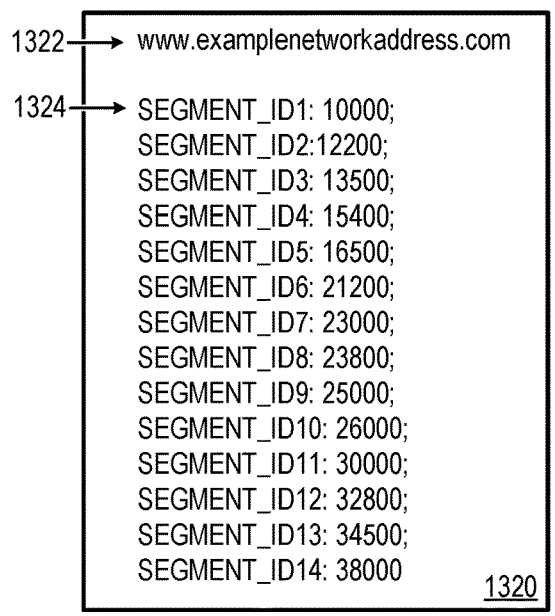

FIG. 13A depicts example data 1310 indicating retrieval locations for a plurality of text-to-speech audio segments of an audio presentation. Data 1310 includes a network address 1312 of a network resource at which the text-to-speech audio segments are stored and a plurality of segment-specific retrieval locations 1314. In this example, a different one of the plurality of segment-specific retrieval locations 1314 is indicated for each of the plurality of text-to-speech audio segments. The fourteen segment-specific retrieval locations 1314 indicate fourteen byte ranges containing fourteen text-to-speech audio segments. These fourteen text-to-speech audio segments correspond to the fourteen unreviewed electronic communications of FIG. 6, as an example.

Furthermore, in this example, the plurality of segment-specific retrieval locations 1314 each take the form of a byte identifier that identifies a boundary of a byte range of the network resource that contains one of the plurality of text-to-speech audio segments. For example, a first byte identifier that includes the value "10000" of the plurality of segment-specific retrieval locations 1314 represents a beginning of a first byte range for a first text-to-speech audio segment that is bounded by a second value of a second byte identifier "12200". In this example, second byte identifier "12200" identifies a beginning of a second byte range for a second text-to-speech audio segment, thereby defining the first byte range as 10000-12199 bytes of the network resource. For example, this first byte range can include the text-to-speech audio segment for electronic communication 530 of FIG. 6. Similarly, the second byte range is defined by the plurality of segment-specific retrieval locations 1314 as 12200-13499 by inclusion of a third byte identifier "13500". This second byte range can include the text-to-speech audio segment for electronic communication 532 of FIG. 6.

In other examples, each segment-specific retrieval location may take the form of two byte identifiers that identify both boundaries of a byte range. For example, the first byte range 10000-12199 may instead be identified by byte identifiers "10000-12199", and the second byte range may instead be identified by byte identifiers 12200-13499. As another example, byte ranges may be identified by a byte identifier in combination with a total quantity of bytes—e.g., "10000, 2200" to refer to the first byte range 10000-12199). These approaches may be used, for example, where padding is added between byte ranges—e.g., "10000-12190" and "12200-13490" to provide 10 bytes of padding. It will be understood that a padding of other suitable size may be used between byte ranges of a network resource.

Also within FIG. 13A, data 1310 defines a data structure in which the plurality of segment-specific retrieval locations 1314 are arranged in an ordered sequence. This ordered sequence may be used to indicate which segment-specific retrieval location refers to which text-to-speech audio segment of the plurality of text-to-speech audio segments of the audio presentation. Alternatively or additionally, this ordered sequence may be used to indicate the presentation order of audio segments within the audio presentation.

As an example, both client-side and server-side programs can independently identify the presentation order of the text-to-speech audio segments within the audio presentation using the same approach, such as previously described with reference to FIGS. 7A and 7B. For example, a server system implementing the server-side program can order the segment-specific retrieval locations within the manifest according to the identified presentation order. By a client computing system implementing the client side program to identify the same order, the client computing system can determine which electronic communication corresponds to which segment-specific retrieval location within the manifest.

As another example, FIG. 13B depicts example data 1320 indicating retrieval locations for a plurality of text-to-speech audio segments of an audio presentation. In this example, data 1320 again includes a network address 1322 of a network resource at which the text-to-speech audio segments are stored and a plurality of segment-specific retrieval locations 1324. Each segment-specific retrieval location in this example includes a byte identifier that is associated with a segment identifier that indicates a text-to-speech audio segment that is associated with each byte range of the network resource. For example, the first byte range 10000-12199 of data 1320 is associated with segment identifier "SEGMENT_ID1" (e.g., corresponding to electronic communication 530 of FIG. 6) and the second byte range 12200-13499 is associated with segment identifier "SEGMENT_ID2" (e.g., corresponding to electronic communication 532 of FIG. 6). Again, a data structure of data 1320 may be used to indicate the presentation order of audio segments within the audio presentation. However, the segment identifiers in this example enable the client computing system to independently identify the presentation order given a set of electronic communications.

Figure 13C:
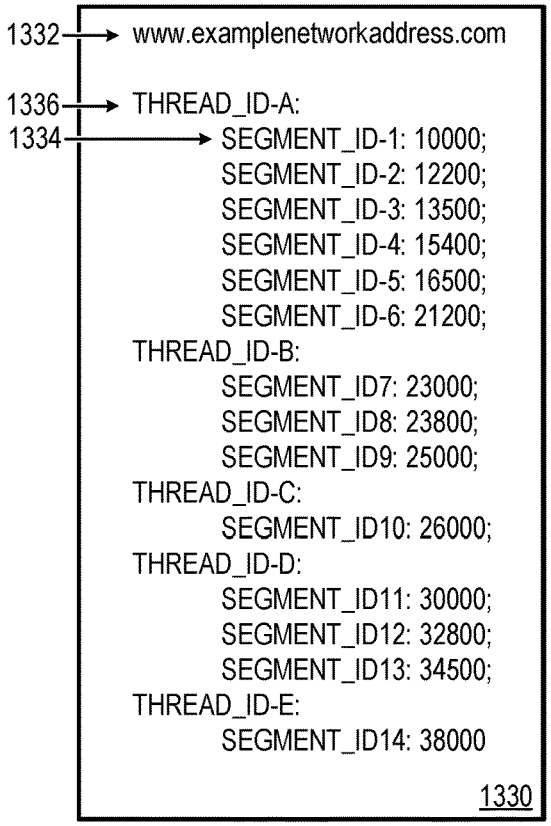

FIG. 13C depicts example data 1330 indicating retrieval locations for a plurality of text-to-speech audio segments of an audio presentation. In this example, data 1330 again includes a network address 1332 of a network resource at which the text-to-speech audio segments are stored and a plurality of segment-specific retrieval locations 1334. However, data 1330 additionally includes a set of conversation thread identifiers 1336 (e.g., "THREAD_ID-A") that identifies which audio segments correspond to which conversation thread. For example, "THREAD_ID-A" can refer to conversation thread 510 of FIG. 6 of which segment identifiers "SEGMENT_ID-1" through "SEGMENT_ID-6" refer to electronic communications 530-540 of FIG. 6. Similarly, "THREAD_ID-B" can refer to conversation thread 514 of FIG. 6 of which segment identifiers "SEG- MENT_ID-7" through "SEGMENT_ID-9" refer to electronic communications 560-564 of FIG. 6.

FIG. 13D depicts example data 1340 indicating retrieval locations for a plurality of text-to-speech audio segments of an audio presentation. In this example, data 1340 includes a plurality of network addresses at 1342, 1344, etc. of respective network resources at which the text-to-speech audio segments are stored and a plurality of segment-specific retrieval locations 1346, 1348, etc. of each network resource. Thus, in this example, each conversation thread is stored at a different network resource.

FIG. 13E depicts example data 1350 indicating retrieval locations for a plurality of text-to-speech audio segments of an audio presentation. In this example, data 1350 includes a network address at 1352 of a network resource at which the text-to-speech audio segments are stored and a plurality of segment-specific retrieval locations 1354. Additionally, data 1350 includes thread identifiers (e.g., THREAD_ID-A) that identify which audio segments correspond to which conversation thread. For example, segment-specific retrieval locations SEGMENT_ID-1 through SEGMENT_ID-6 form part of a first conversation thread identified by THREAD_ID-A, whereas segment-specific retrieval locations SEGMENT_ID-7 through SEGMENT_ID-9 form part of a second conversation thread identified by THREAD_ID-B. Further, in this example, retrieval locations are provided for additional audio segments (e.g., 1356, 1358.) identified as SEGMENT_ID-A, SEGMENT_ID-B, etc. that are not necessarily text-to-speech audio segments, but include computer generated speech such as a thread summary (e.g., 420 of FIG. 4) or communication summary (e.g., 422 of FIG. 4) for respective conversation threads or electronic communications thereof. Thus, a server computing system can generate audio segments for an audio presentation that describe aspects of electronic communications for a client computing system, such as previously described with reference to FIGS. 8, 9, and 10.

In at least some examples, the methods and processes described herein may be tied to a computing system of one or more computing devices. In particular, such methods and processes may be implemented as a computer-application program or service, an application-programming interface (API), a library, and/or other computer-program product.

Referring again to FIG. 2, computing system 200 is an example computing system that can enact one or more of the methods and operations described herein. Computing system 200 is shown in simplified form. Computing system 200 may take the form of one or more mobile computing devices, wearable computing devices, computing devices integrated with vehicles, desktop computing devices, household appliance computing devices, personal computers, server computers, tablet computers, home-entertainment computers, network computing devices, gaming devices, mobile computing devices, mobile communication devices (e.g., smart phone), Internet of Things (IoT) devices, embedded computing devices, and/or other computing devices.

Logic subsystem 212 may include one or more processors configured to execute software instructions. Additionally or alternatively, the logic subsystem may include one or more hardware or firmware logic circuits configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 214 may include removable and/or built-in devices. Storage subsystem 214 may include optical memory (e.g., CD, DVD, HD-DVD, or Blu-Ray Disc), semiconductor memory (e.g., RAM, EPROM, or EEPROM), and/or magnetic memory (e.g., hard-disk drive, floppy-disk drive, tape drive, or MRAM), among others. Storage subsystem 214 may include volatile, nonvolatile, dynamic, static, read/write, read-only, random-access, sequential-access, location-addressable, file-addressable, and/or content-addressable devices. It will be appreciated that storage subsystem 214 includes one or more physical devices and is not merely an electromagnetic signal, an optical signal, etc. that is not held by a physical device for a finite duration.

Aspects of logic subsystem 212 and storage subsystem 214 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When the methods and operations described herein are implemented by logic subsystem 212 and storage subsystem 214, a state of storage subsystem 214 may be transformed— e.g., to hold different data. For example, logic subsystem 212 may be configured to execute instructions 222 that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem and the storage subsystem may cooperate to instantiate one or more logic machines, such as previously described with reference to personal assistant machine 230, speech output machine 232, speech input machine 234, feature identification machine 932, data extraction machine 942, data analysis machine 952, and narrative creation machine 962. It will be understood that the "machines" as described herein (e.g., with reference to FIGS. 2 and 9) are never abstract ideas and always have a tangible form. Instructions 222 that provide a particular machine with functionality in combination with hardware may optionally be saved as an unexecuted module on a suitable storage device, and such a module may be transmitted via network communication and/or transfer of the physical storage device on which the module is saved.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AT knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, or formants). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, or band-pass filters. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

In at least some examples, I/O subsystem 216 may include or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be appreciated that a "service", as used herein, is an application program executable across multiple user sessions. A service may be available to one or more system components, programs, and/or other services. In some implementations, a service may run on one or more server-computing devices.

According to an example of the present disclosure, a method performed by a client computing system comprises: sending to a server system a presentation request for an audio presentation of electronic communications; receiving from the server system a manifest indicating a plurality of segment-specific retrieval locations in which a different one of the plurality of segment-specific retrieval locations is indicated for each of a plurality of text-to-speech audio segments of the audio presentation; for each of the plurality of text-to-speech audio segments: identifying a presentation order of the text-to-speech audio segment within the audio presentation; sending to the server system a segment request for the text-to-speech audio segment at the segment-specific retrieval location for that text-to-speech audio segment; receiving from the server system the text-to-speech audio segment responsive to the segment request for that text-to-speech audio segment; and outputting the text-to-speech audio segment in the identified presentation order. In this or other examples disclosed herein, each of the plurality of segment-specific retrieval locations indicated by the manifest include a byte range containing one of the plurality of text-to-speech audio segments at a network resource. In this or other examples disclosed herein, the plurality of segment-specific retrieval locations are located at the network resource; and wherein the manifest identifies a network address of the network resource. In this or other examples disclosed herein, the plurality of segment-specific retrieval locations indicated by the manifest include a plurality of network addresses of a plurality of network resources; and one of the plurality of text-to-speech audio segments is located at each of the plurality of network resources. In this or other examples disclosed herein, the method further comprises: storing, within a storage device of the client computing system, each of the plurality of text-to-speech audio segments received from the server system; for each of the plurality of text-to-speech audio segments stored at the client computing system, associating a storage location identifier indicating a storage location of the text-to-speech audio segment with a segment identifier; and the outputting of the text-to-speech audio segment in the identified presentation order includes retrieving the text-to-speech audio segment from the storage location within the storage device indicated by the storage location identifier associated with the segment identifier of the text-to-speech audio segment. In this or other examples disclosed herein, the receiving of the text-to-speech audio segment from the server system includes streaming the text-to-speech audio segment; and the method further comprises storing, within a streaming buffer within a storage device of the client computing system, each of the plurality of text-to-speech audio segments received from the server system; the outputting of the text-to-speech audio segment in the identified presentation order includes outputting the text-to-speech audio segment from the streaming buffer. In this or other examples disclosed herein, the method further comprises: receiving an indication of one or more new inbound electronic communications; responsive to receiving the indication of the new inbound electronic communication, sending to the server system a new presentation request for a new audio presentation of the one or more new inbound electronic communications; and receiving from the server system a new manifest indicating one or more segment-specific retrieval locations for the one or more new inbound electronic communications. In this or other examples disclosed herein, the identifying of the presentation order of the text-to-speech audio segment within the audio presentation is based on a structure of the plurality of segment-specific retrieval locations indicated by the manifest. In this or other examples disclosed herein, each of the segment-specific retrieval locations is associated with a segment identifier within the manifest; and the segment identifier identifies an electronic communication of the audio presentation. In this or other examples disclosed herein, the electronic communications include a plurality of unreviewed electronic communications for a recipient in which unreviewed electronic communications that are reply-linked to each other form a conversation thread of a plurality of conversation threads; and the outputting of the text-to-speech audio segment of the plurality of text-to-speech audio segments includes: for each conversation thread of the plurality of conversation threads, outputting the text-to-speech audio segment of each of the unreviewed electronic communications of that conversation thread in a chronological-sequential order before outputting the text-to-speech audio segment of an unreviewed electronic communication of another of the plurality of conversation threads. In this or other examples disclosed herein, the presentation order among the plurality of conversation threads is a reverse-chronological order beginning with a most-recent conversation thread having a most-recent unreviewed electronic communication among the plurality of unreviewed electronic communications. In this or other examples disclosed herein, the method further comprises establishing a new network connection with the server system that differs from a network connection over which the manifest is received; and sending the segment request for the text-to-speech audio segment of one or more of the plurality of text-to-speech audio segments over the new network connection established with the server system.

According to another example of the present disclosure, a client computing system comprises: an audio output interface to output audio via one or more audio speakers; a communications interface for communication via a communications network; a logic subsystem; and a storage subsystem having instructions stored thereon executable by the logic subsystem to: send to a server system via the communications interface a presentation request for an audio presentation of electronic communications; receive from the server system via the communications interface a manifest indicating a plurality segment-specific retrieval locations in which a different one of the plurality of segment-specific retrieval locations is indicated for each of a plurality of text-to-speech audio segments of the audio presentation; for each of the plurality of text-to-speech audio segments: identify a presentation order of the text-to-speech audio segment within the audio presentation; send to the server system via the communications interface a segment request for the text-to-speech audio segment at the segment-specific retrieval location for that text-to-speech audio segment; receive from the server system via the communications interface the text-to-speech audio segment responsive to the segment request for that text-to-speech audio segment; and output via the audio output interface the text-to-speech audio segment in the identified presentation order. In this or other examples disclosed herein, each of the plurality of segment-specific retrieval locations indicated by the manifest include a byte range containing one of the plurality of text-to-speech audio segments at a network resource. In this or other examples disclosed herein, the plurality of segment-specific retrieval locations are located at the network resource; and the manifest identifies a network address of the network resource. In this or other examples disclosed herein, the plurality of segment-specific retrieval locations indicated by the manifest include a plurality of network addresses of a plurality of network resources; and one of the plurality of text-to-speech audio segments is located at each of the plurality of network resources. In this or other examples disclosed herein, the instructions are further executable by the logic subsystem to: receive an indication of one or more new inbound electronic communications; responsive to receiving the indication of the new inbound electronic communication, send to the server system a new presentation request for a new audio presentation of the one or more new inbound electronic communications; and receive from the server system a new manifest indicating one or more segment-specific retrieval locations for the one or more new inbound electronic communications. In this or other examples disclosed herein, the electronic communications include a plurality of unreviewed electronic communications for a recipient in which unreviewed electronic communications that are reply-linked to each other form a conversation thread of a plurality of conversation threads; and the presentation order includes, for each conversation thread of the plurality of conversation threads, outputting the text-to-speech audio segment of each of the unreviewed electronic communications of that conversation thread in a chronological-sequential order before outputting the text-to-speech audio segment of an unreviewed electronic communication of another of the plurality of conversation threads; the presentation order among the plurality of conversation threads is a reverse-chronological order beginning with a most-recent conversation thread having a most-recent unreviewed electronic communication among the plurality of unreviewed electronic communications. In this or other examples disclosed herein, the instructions are further executable by the logic subsystem to: establish a new network connection with the server system that differs from a network connection over which the manifest is received; and send the segment request for the text-to-speech audio segment of one or more of the plurality of text-to-speech audio segments over the new network connection established with the server system.

According to another example of the present disclosure, a method performed by a server system of one or more servers comprises: for each of a plurality of electronic communications: performing text-to-speech conversion of the electronic communication to obtain a text-to-speech audio segment for that electronic communication, and storing the text-to-speech audio segment at a segment-specific retrieval location of the server system as one of a plurality of text-to-speech audio segments of the plurality of electronic communications; generating a manifest indicating a plurality of segment-specific retrieval locations in which a different one of the plurality of segment-specific retrieval locations is indicated for each of the plurality of text-to-speech audio segments; receiving a presentation request for an audio presentation of the plurality of text-to-speech audio segments of the plurality of electronic communications from a remote computing system; sending the manifest indicating the plurality of segment-specific retrieval locations to the remote computing system; receiving from the remote computing system a segment request for a text-to-speech audio segment at a segment-specific retrieval location of the plurality of segment-specific retrieval locations; responsive to the segment request, retrieving the text-to-speech audio segment from the segment-specific retrieval location; sending the text-to-speech audio segment retrieved from the segment-specific retrieval location to the remote computing system over the network connection.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a client computing system, the method comprising:
sending to a server system a presentation request for an audio presentation of electronic communications;
receiving from the server system a manifest indicating a plurality of segment-specific retrieval locations in which a different one of the plurality of segment-specific retrieval locations is indicated for each of a plurality of text-to-speech audio segments of the audio presentation;
for each of the plurality of text-to-speech audio segments:
identifying a presentation order of the text-to-speech audio segment within the audio presentation;
sending to the server system a segment request for the text-to-speech audio segment at the segment-specific retrieval location for that text-to-speech audio segment;
receiving from the server system the text-to-speech audio segment responsive to the segment request for that text-to-speech audio segment; and
outputting the text-to-speech audio segment in the identified presentation order;
wherein the electronic communications include a plurality of unreviewed electronic communications for a recipient in which unreviewed electronic communications that are reply-linked to each other form a conversation thread of a plurality of conversation threads; and
wherein outputting the text-to-speech audio segment of the plurality of text-to-speech audio segments includes:
for each conversation thread of the plurality of conversation threads, outputting the text-to-speech audio segment of each of the unreviewed electronic communications of that conversation thread in a chronological-sequential order before outputting the text-to-speech audio segment of an unreviewed electronic communication of another of the plurality of conversation threads.

2. The method of claim 1, wherein each of the plurality of segment-specific retrieval locations indicated by the manifest include a byte range containing one of the plurality of text-to-speech audio segments at a network resource.

3. The method of claim 2, wherein the plurality of segment-specific retrieval locations are located at the network resource; and
wherein the manifest identifies a network address of the network resource.

4. The method of claim 1, wherein the plurality of segment-specific retrieval locations indicated by the manifest include a plurality of network addresses of a plurality of network resources;
wherein one of the plurality of text-to-speech audio segments is located at each of the plurality of network resources.

5. The method of claim 1, further comprising:
storing, within a storage device of the client computing system, each of the plurality of text-to-speech audio segments received from the server system;
for each of the plurality of text-to-speech audio segments stored at the client computing system, associating a storage location identifier indicating a storage location of the text-to-speech audio segment with a segment identifier; and
wherein outputting the text-to-speech audio segment in the identified presentation order includes retrieving the text-to-speech audio segment from the storage location within the storage device indicated by the storage location identifier associated with the segment identifier of the text-to-speech audio segment.

6. The method of claim 1, wherein receiving the text-to-speech audio segment from the server system includes streaming the text-to-speech audio segment; and
wherein the method further comprises storing, within a streaming buffer within a storage device of the client computing system, each of the plurality of text-to-speech audio segments received from the server system; and
wherein outputting the text-to-speech audio segment in the identified presentation order includes outputting the text-to-speech audio segment from the streaming buffer.

7. The method of claim 1, further comprising:
receiving an indication of one or more new inbound electronic communications;
responsive to receiving the indication of the one or more new inbound electronic communications, sending to the server system a new presentation request for a new audio presentation of the one or more new inbound electronic communications; and
receiving from the server system a new manifest indicating one or more segment-specific retrieval locations for the one or more new inbound electronic communications.

8. The method of claim 1, wherein identifying the presentation order of the text-to-speech audio segment within the audio presentation is based on a structure of the plurality of segment-specific retrieval locations indicated by the manifest.

9. The method of claim 1, wherein each of the segment-specific retrieval locations is associated with a segment identifier within the manifest;
wherein the segment identifier identifies an electronic communication of the audio presentation.

10. The method of claim 1, wherein the presentation order among the plurality of conversation threads is a reverse-chronological order beginning with a most-recent conversation thread having a most-recent unreviewed electronic communication among the plurality of unreviewed electronic communications.

11. The method of claim 1, further comprising:
establishing a new network connection with the server system that differs from a network connection over which the manifest is received; and
sending the segment request for the text-to-speech audio segment of one or more of the plurality of text-to-speech audio segments over the new network connection established with the server system.

12. A client computing system, comprising:
an audio output interface to output audio via one or more audio speakers;
a communications interface for communication via a communications network;
a logic subsystem; and
a storage subsystem having instructions stored thereon executable by the logic subsystem to:
send to a server system via the communications interface a presentation request for an audio presentation of electronic communications;
receive from the server system via the communications interface a manifest indicating a plurality segment-specific retrieval locations in which a different one of the plurality of segment-specific retrieval locations is indicated for each of a plurality of text-to-speech audio segments of the audio presentation;
for each of the plurality of text-to-speech audio segments:
identify a presentation order of the text-to-speech audio segment within the audio presentation;
send to the server system via the communications interface a segment request for the text-to-speech audio segment at the segment-specific retrieval location for that text-to-speech audio segment;
receive from the server system via the communications interface the text-to-speech audio segment responsive to the segment request for that text-to-speech audio segment; and
output via the audio output interface the text-to-speech audio segment in the identified presentation order;
wherein the electronic communications include a plurality of unreviewed electronic communications for a recipient in which unreviewed electronic communications that are reply-linked to each other form a conversation thread of a plurality of conversation threads; and
wherein output of the text-to-speech audio segment of the plurality of text-to-speech audio segments includes:
for each conversation thread of the plurality of conversation threads, outputting the text-to-speech audio segment of each of the unreviewed electronic communications of that conversation thread in a chronological-sequential order before outputting the text-to-speech audio segment of an unreviewed electronic communication of another of the plurality of conversation threads.

13. The client computing system of claim 12, wherein each of the plurality of segment-specific retrieval locations indicated by the manifest include a byte range containing one of the plurality of text-to-speech audio segments at a network resource.

14. The client computing system of claim 13, wherein the plurality of segment-specific retrieval locations are located at the network resource; and
wherein the manifest identifies a network address of the network resource.

15. The client computing system of claim 12, wherein the plurality of segment-specific retrieval locations indicated by the manifest include a plurality of network addresses of a plurality of network resources;
wherein one of the plurality of text-to-speech audio segments is located at each of the plurality of network resources.

16. The client computing system of claim 12, wherein the instructions are further executable by the logic subsystem to:
receive an indication of one or more new inbound electronic communications;
responsive to receiving the indication of the one or more new inbound electronic communications, send to the server system a new presentation request for a new audio presentation of the one or more new inbound electronic communications; and receive from the server system a new manifest indicating one or more segment-specific retrieval locations for the one or more new inbound electronic communications.

17. The client computing system of claim 12, wherein the presentation order among the plurality of conversation threads is a reverse-chronological order beginning with a most-recent conversation thread having a most-recent unreviewed electronic communication among the plurality of unreviewed electronic communications.

18. The client computing system of claim 12, wherein the instructions are further executable by the logic subsystem to:

establish a new network connection with the server system that differs from a network connection over which the manifest is received; and send the segment request for the text-to-speech audio segment of one or more of the plurality of text-to-speech audio segments over the new network connection established with the server system.

19. A method performed by a computing system including a server system of one or more servers and a remote computing system, the method comprising:

at the server system:

for each of a plurality of electronic communications:

performing text-to-speech conversion of the electronic communication to obtain a text-to-speech audio segment for that electronic communication, and storing the text-to-speech audio segment at a segment-specific retrieval location of the server system as one of a plurality of text-to-speech audio segments of the plurality of electronic communications, wherein the plurality of electronic communications include a plurality of unreviewed electronic communications for a recipient in which unreviewed electronic communications that are reply-linked to each other form a conversation thread of a plurality of conversation threads;

generating a manifest indicating a plurality of segment-specific retrieval locations in which a different one of the plurality of segment-specific retrieval locations is indicated for each of the plurality of text-to-speech audio segments;

receiving a presentation request for an audio presentation of the plurality of text-to-speech audio segments of the plurality of electronic communications from a remote computing system;

sending the manifest indicating the plurality of segment-specific retrieval locations to the remote computing system;

receiving from the remote computing system a segment request for a text-to-speech audio segment at a segment-specific retrieval location of the plurality of segment-specific retrieval locations;

responsive to the segment request, retrieving the text-to-speech audio segment from the segment-specific retrieval location; and sending the text-to-speech audio segment retrieved from the segment-specific retrieval location to the remote computing system over the network connection; and at the remote computing system:

outputting the text-to-speech audio segment of the plurality of text-to-speech audio segments in a presentation order, including for each conversation thread of the plurality of conversation threads, outputting the text-to-speech audio segment of each of the unreviewed electronic communications of that conversation thread in a chronological-sequential order before outputting the text-to-speech audio segment of an unreviewed electronic communication of another of the plurality of conversation threads.

20. The method of claim 19, further comprising:

at the server system:

for each of the plurality of text-to-speech audio segments, sending that text-to-speech audio segment retrieved from a respective segment-specific retrieval location to the remote computing system over the network connection; and wherein the presentation order among the plurality of conversation threads is a reverse-chronological order beginning with a most-recent conversation thread having a most-recent unreviewed electronic communication among the plurality of unreviewed electronic communications.

* * * * *